United States Patent [19]

Hiraishi et al.

[11] Patent Number: 5,414,879
[45] Date of Patent: May 16, 1995

[54] SHOWER APPARATUS

[75] Inventors: Kazuo Hiraishi; Masaru Zaitsu; Masanori Sakuragi; Yasuharu Kato, all of Kitakyushu, Japan

[73] Assignee: Toto, Ltd., Kitakyushu, Japan

[21] Appl. No.: 164,439

[22] Filed: Dec. 9, 1993

Related U.S. Application Data

[60] Division of Ser. No. 101,103, Aug. 3, 1993, abandoned, which is a continuation of Ser. No. 668,152, Mar. 12, 1991, abandoned.

[30] Foreign Application Priority Data

| Mar. 12, 1990 | [JP] | Japan | 2-60290 |
| Mar. 27, 1990 | [JP] | Japan | 2-79999 |
| Mar. 31, 1990 | [JP] | Japan | 2-86049 |

[51] Int. Cl.⁶ ............................................. A47K 3/22
[52] U.S. Cl. ................................. 4/601; 4/605; 4/668
[58] Field of Search .................. 4/546, 559, 567, 568, 4/570, 597, 605, 615, 668, 569, 601; 236/12.12; 126/362

[56] References Cited

U.S. PATENT DOCUMENTS

| 335,785 | 2/1886 | Taylor | 4/601 |
| 3,121,235 | 2/1964 | Gellmann | 4/570 |
| 3,827,088 | 8/1974 | Arnold et al. | 4/570 |
| 4,563,780 | 1/1986 | Pollack | 4/546 X |
| 4,606,325 | 8/1986 | Lujan, Jr. | 126/362 |
| 4,688,273 | 8/1987 | Lyng | 4/668 |
| 4,700,884 | 10/1987 | Barrett et al. | 4/668 X |
| 4,801,091 | 1/1989 | Sandvik | 4/567 X |
| 4,854,499 | 8/1989 | Neuman | 4/605 X |
| 5,121,511 | 6/1992 | Sakamoto et al. | 4/601 |

FOREIGN PATENT DOCUMENTS

| 0297544 | 1/1989 | European Pat. Off. | |
| 0306235 | 3/1989 | European Pat. Off. | |
| 0327041 | 8/1989 | European Pat. Off. | 4/597 |
| 0375259 | 6/1990 | European Pat. Off. | |
| 3622139 | 1/1988 | Germany | 4/668 |
| 62-70880 | 5/1987 | Japan | |
| 63-69913 | 5/1988 | Japan | |
| 2-19291 | 2/1990 | Japan | |
| 304127 | 12/1990 | Japan | 4/605 |
| 1024300 | 3/1966 | United Kingdom | 4/601 |

OTHER PUBLICATIONS

Translation of Japanese Patent Document No. SHO 62-70880, published on May 6, 1987.
Translation of Japanese Patent Document No. SHO 63-69913, published on May 11, 1988.
Translation of Japanese Patent Document No. HEI 2-19291, published on Feb. 8, 1990.
European Search Report and Annex.

*Primary Examiner*—Robert M. Fetsuga
*Attorney, Agent, or Firm*—Sandler Greenblum & Bernstein

[57] ABSTRACT

The present invention is related to a shower apparatus provided with a plurality of shower discharge ports. More specifically, a shower apparatus is disclosed in which hot water remains in a hot water line connected to several shower discharge ports, after a discharge has been completed. Hot water within the hot water line which has lowered in temperature is drained through a drain valve in order to dispose of the water. At the beginning of the next shower discharge, cold water is prevented from being discharged. The operation of an opening and closing valve for effecting discharge and stoppage of each shower discharge port is controlled according to control programs, whereby the shower discharge is substantially controlled. The content of the shower discharge, carried out according to the programs, can be changed by a user through the operation of a central section. Moreover, upon the start of a shower discharge, a sudden jet of water is prevented.

18 Claims, 24 Drawing Sheets

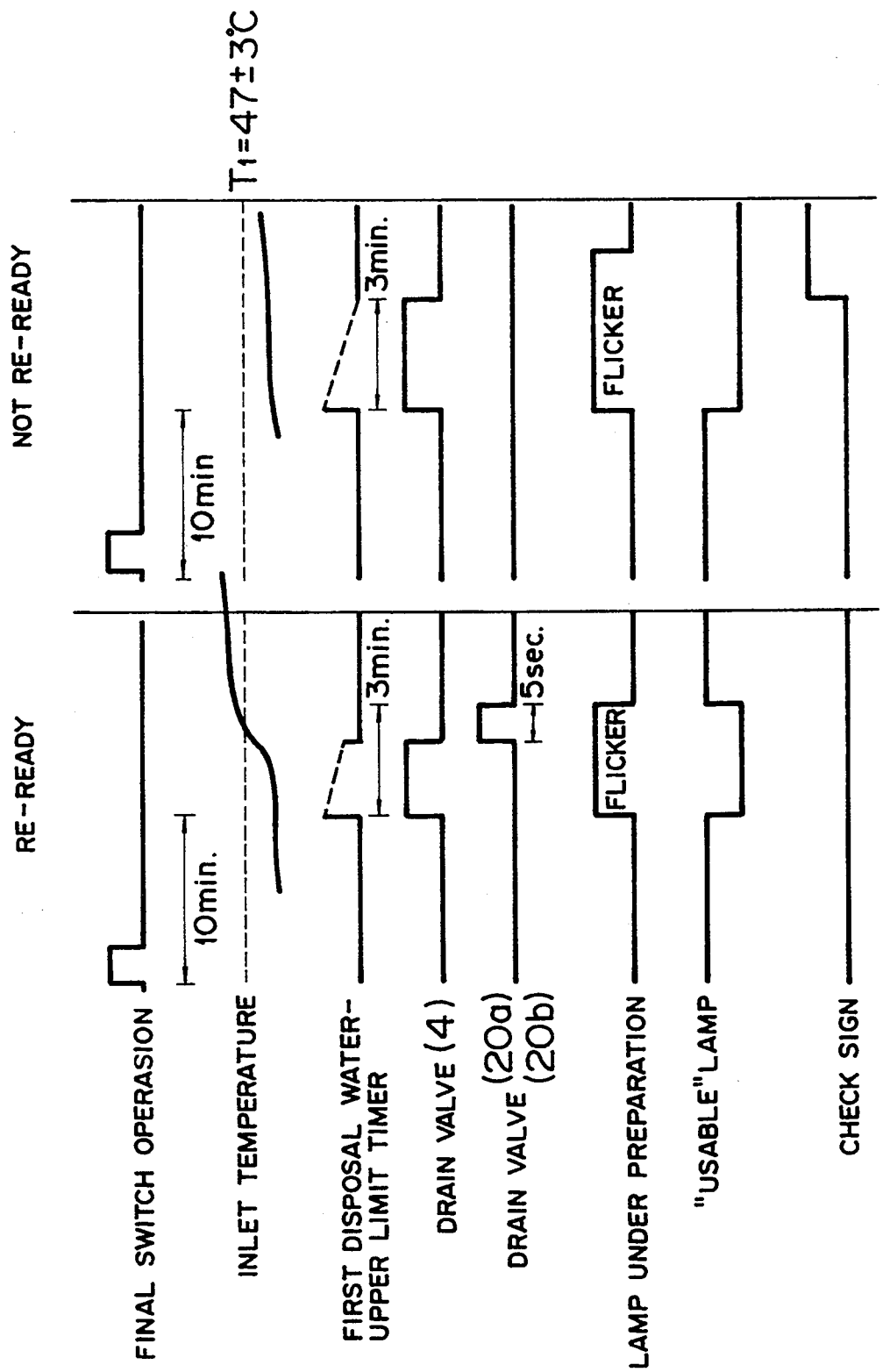

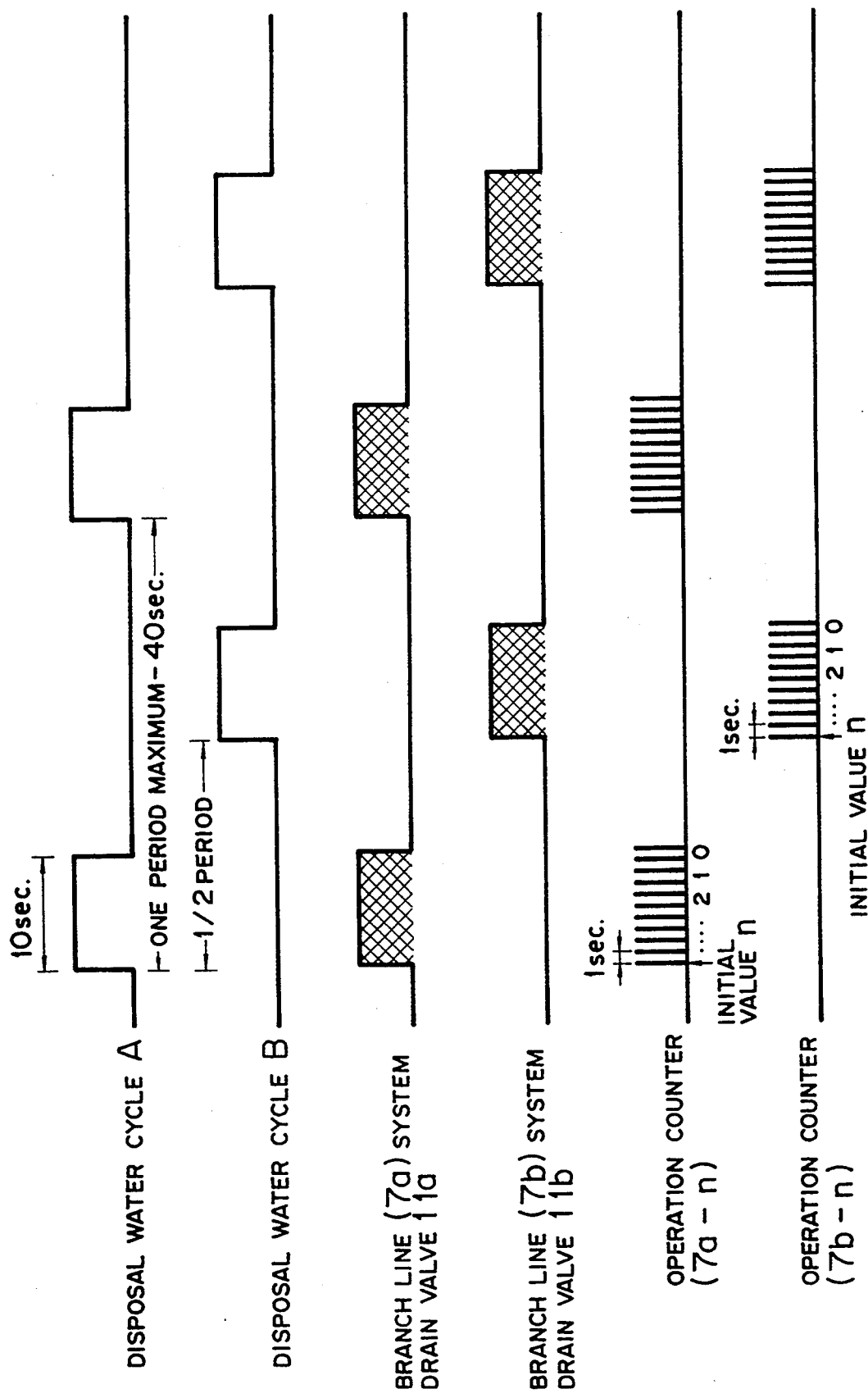

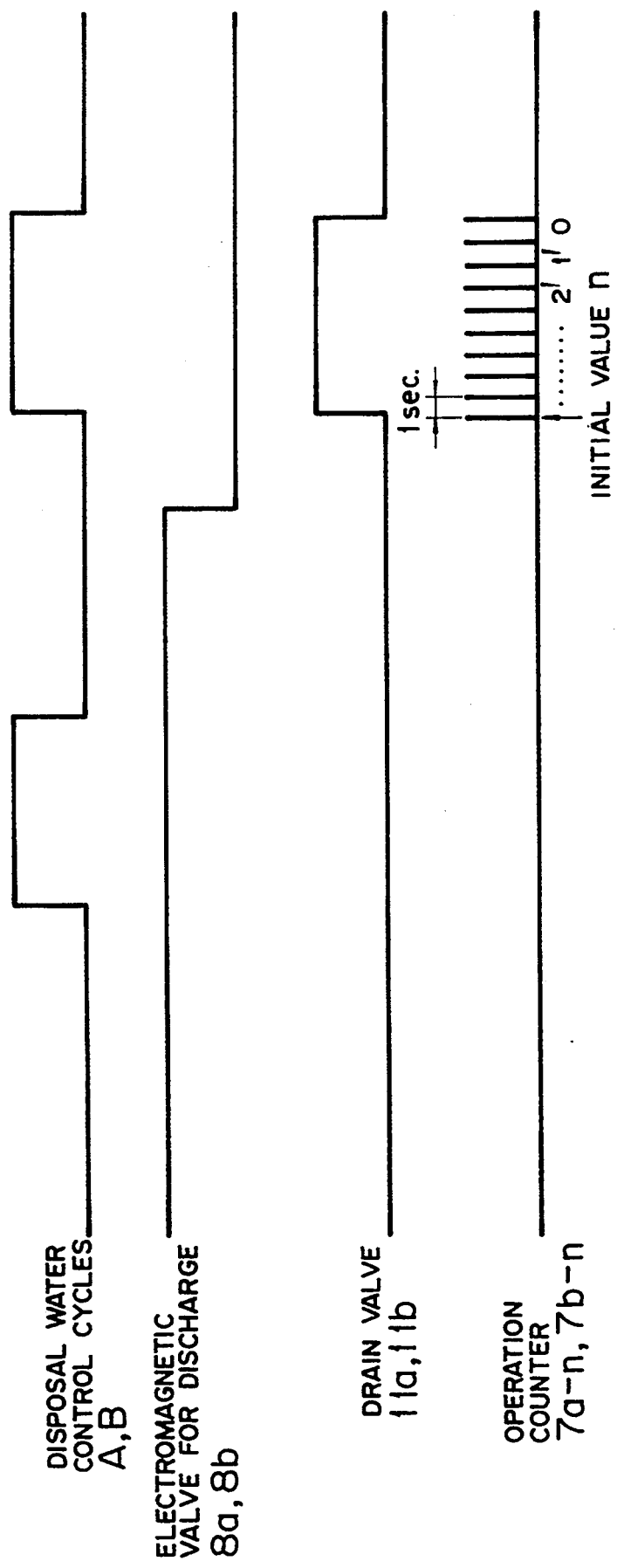

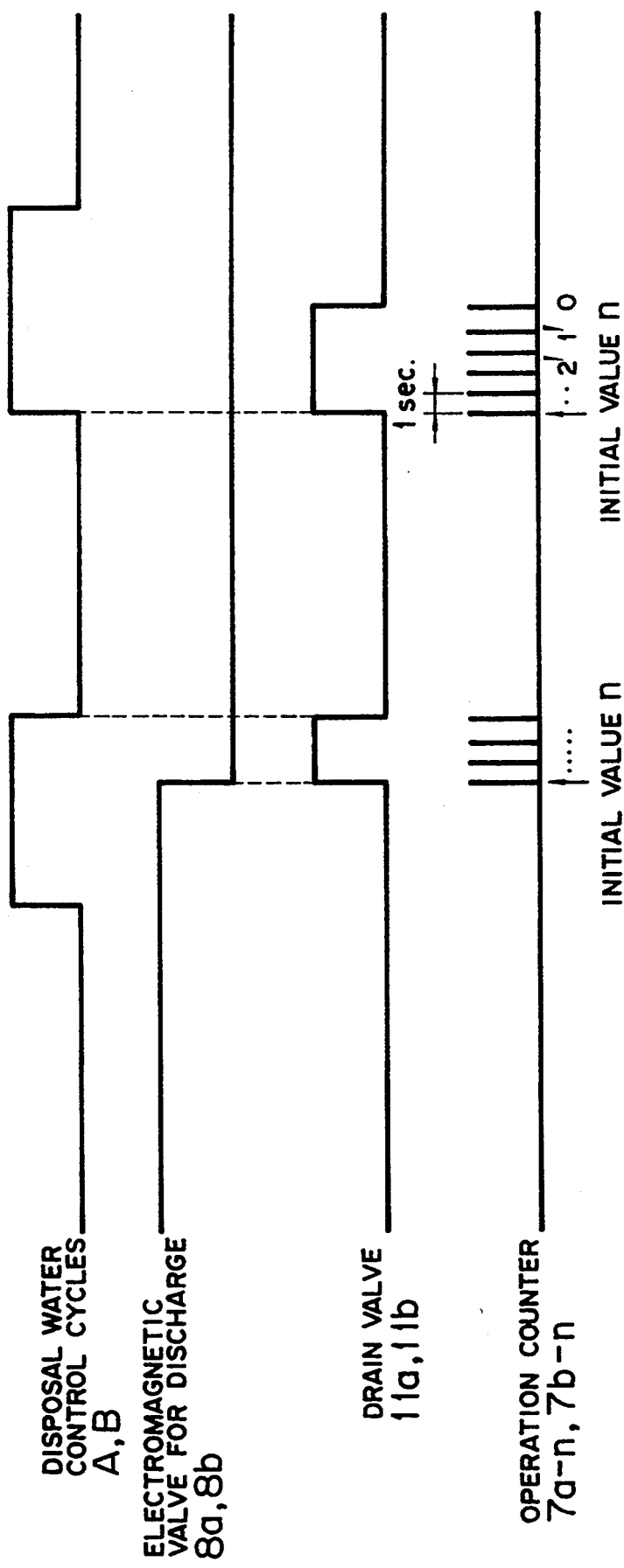

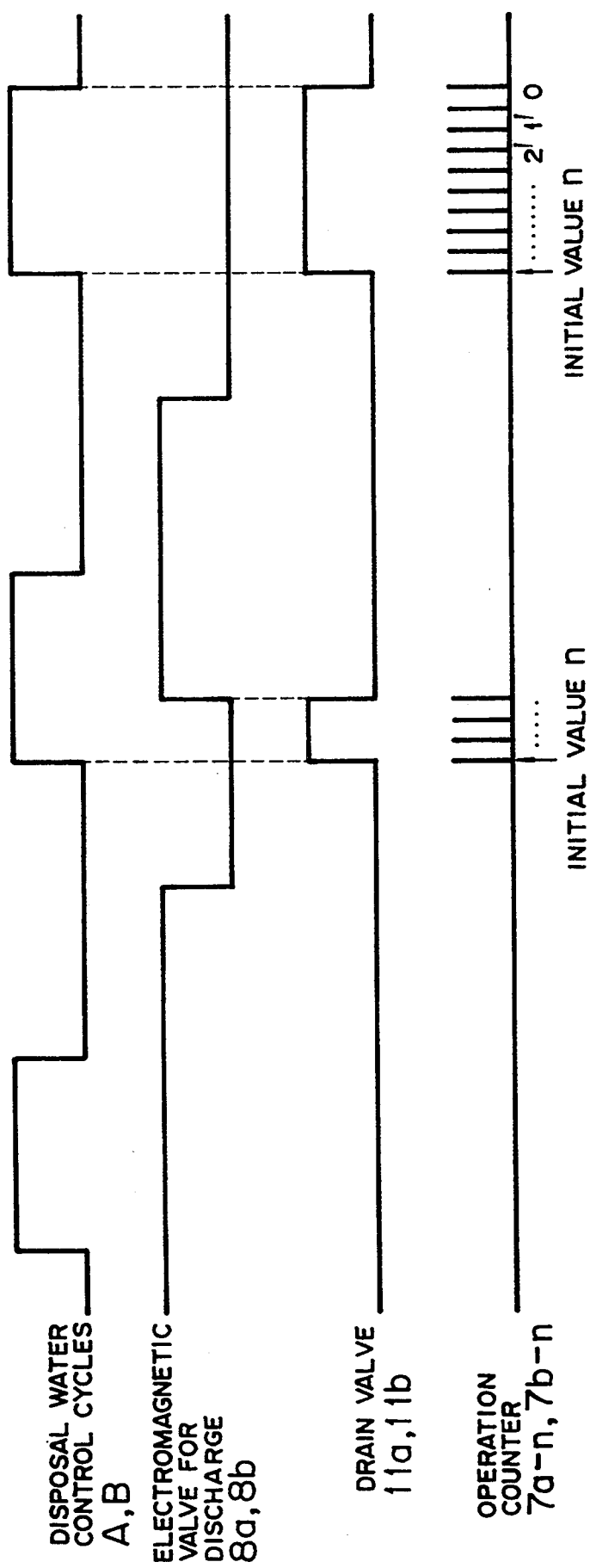

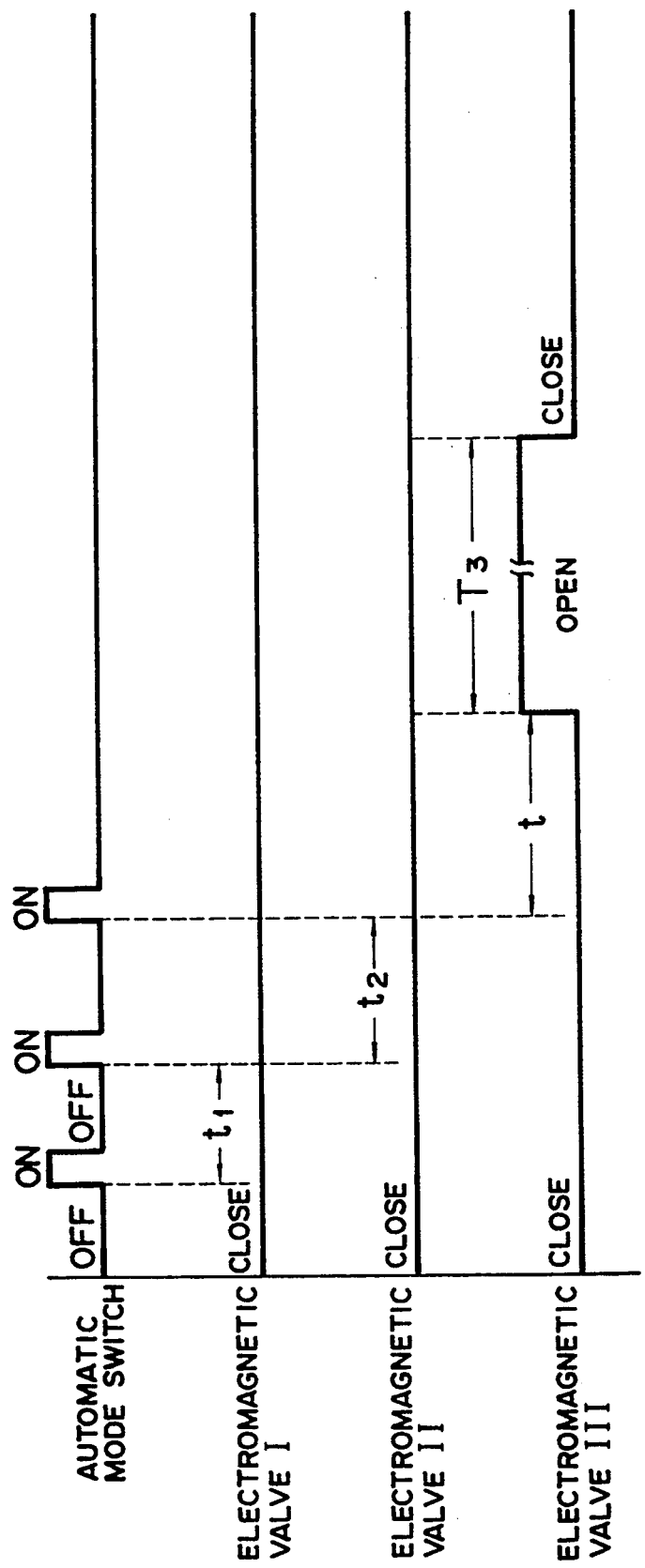

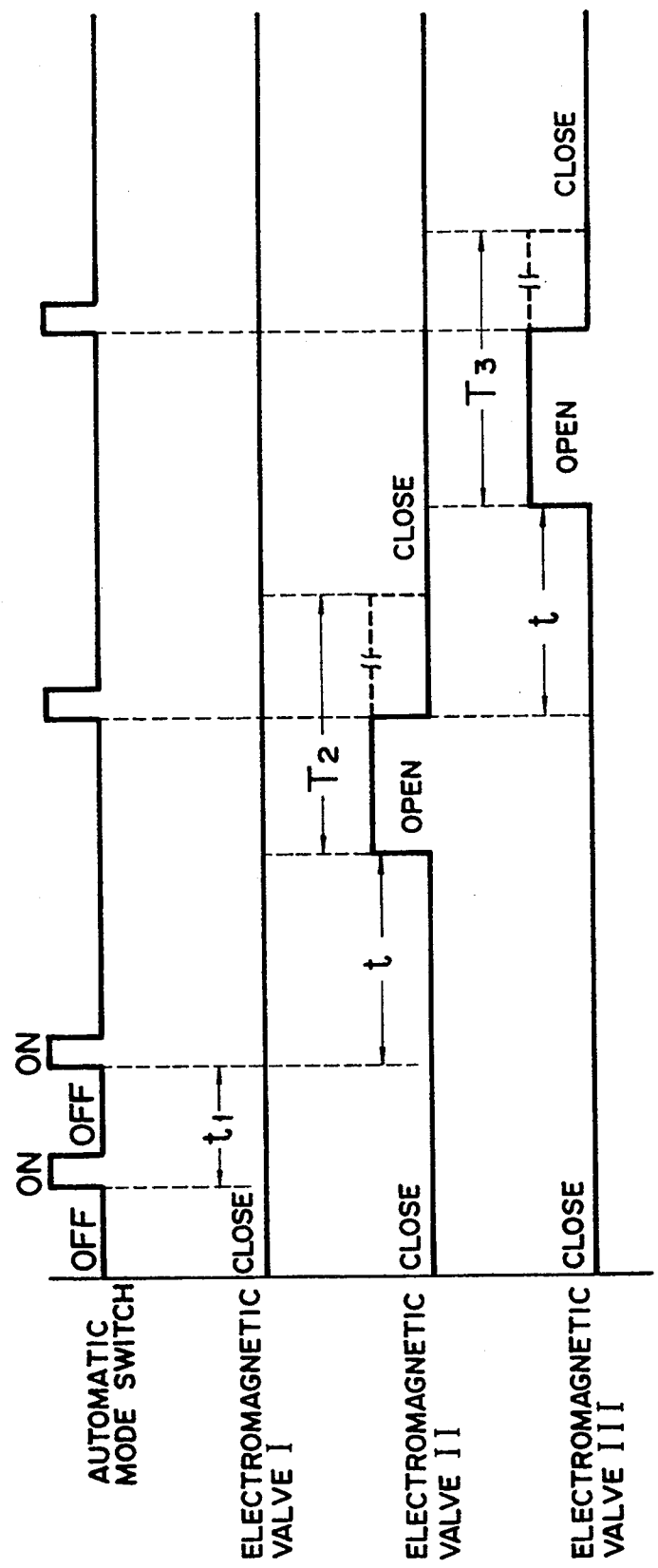

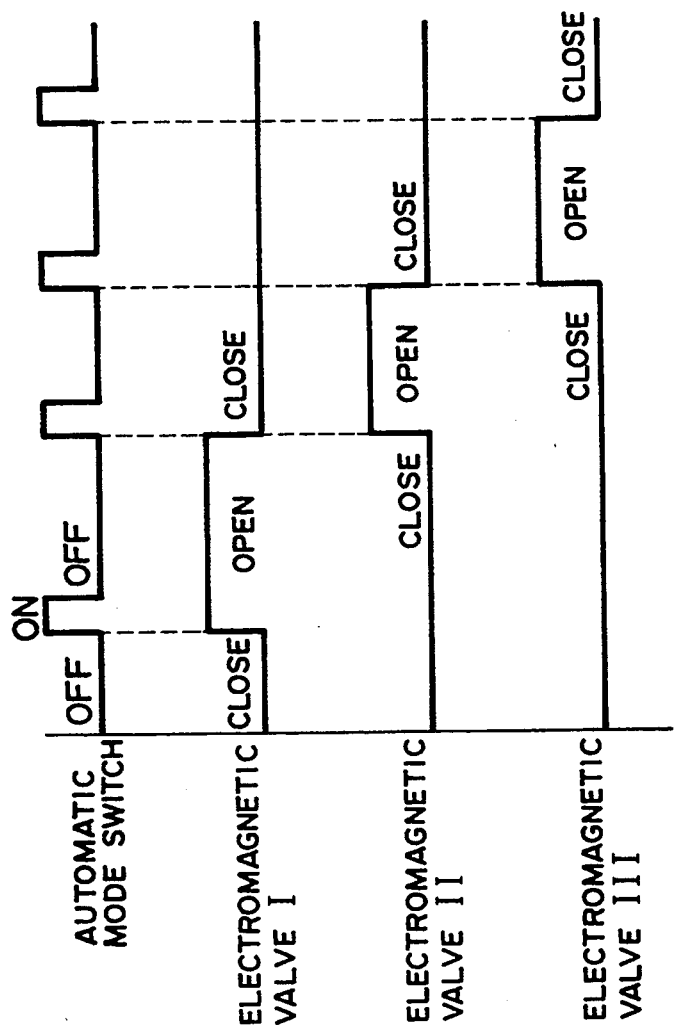

SHOWER APPARATUS

This application is a division of application Ser. No. 08/101,103, filed Aug. 3, 1993, now abandoned, which is a continuation of U.S. Ser. No. 07/668,152, filed Mar. 12, 1991, now abandoned.

BACKGROUND OF THE INVENTION

1. Field of the Invention

The present invention is related to a shower apparatus. More specifically, the present invention relates to a shower apparatus which has a water-discharge function. The shower apparatus can simultaneously discharge water from each of a plurality of shower discharge ports from a single position or a plurality of positions. A water disposal drains hot water that remains within a hot water passage in communication with each shower discharge port, when the temperature of the hot water has lowered, before a succeeding shower discharge. The water disposal is performed in order to prevent cold water from being discharged when the shower is used. Water discharge from each shower discharge port can be programmed and thus automatically controlled.

2. Background and Material Information

A shower system is disclosed in Japanese Utility Model Laid-Open No. 069913/1988.

FIG. 13 shows a shower apparatus provided with a number of shower discharge ports. This shower apparatus is designed to supply hot water from a hot water source (not shown) to the hot water side of a cold and hot water mixing cock 101 through a first hot water line 102. The apparatus delivers hot water, mixed to have a suitable temperature at the cold and hot water mixing cock 101, to each discharging electromagnetic valve 104 through a second hot water line 103 that is branched into two lines 103a and 103b.

The discharging electromagnetic valves 104 are paired with each of drain valves 105, and the sets of paired valves are arranged in parallel. A third hot water line 106 is in communication with various shower discharge ports $S_1$ to $S_5$ downstream of both the valves 104 and 105. Reference numeral 112, provided on the second hot water line 103, designates a stop valve. A drain line 108 is branched from the downstream side of the valve 112, and a drain valve 109 is provided in the drain line 108. A circulation line 111 is provided on a hot-water side check valve 110, of the hot and cold water mixing cock 101, to return hot water from the first hot water line 102 back toward the hot water source, when necessary.

As the shower is used repeatedly, the temperature of the water remaining in the first hot water line 102, the second hot water line 103 and the third hot water line 106 lowers. Accordingly, a person that last uses the shower, bathes in cold water remaining in the water lines 106, 103 and 102.

In order to prevent the low-temperature water from being discharged at the beginning of use, it is necessary to replace cold water in the first, second and third hot water lines 102, 103 and 106 with new hot water before use. In the aforementioned shower apparatus, the hot water in line 102 is returned to the hot water source through the circulation line 111 for circulation to thereby exchange hot water. The hot water in the second and third hot water lines (103 and 106) is replaced with new hot water by closing the stop valve 112 to stop hot water from the cold and hot water mixing cock 101, and then opening the drain valves 105 and 109 to thereby cause a back flow of the remaining hot water in the whole system through the second hot water line 103 to remove water from the drain line 108.

The aforementioned exchange of hot water using the circulation line 111 is called a circulation system, and the exchange of hot water by the drainage from the water discharge line 108 is called the disposal water of a water-removal system.

However, in the case of exchange of hot water in the first hot water line 102, according to the aforementioned circulation system of the shower apparatus, equipment of the circulation line 111 and a circulation mechanism (not shown) are necessary, resulting in a complexity of construction and an increase of execution and inspection cost.

Moreover, for example, when time passes without using the shower, the temperature of hot water remaining in the third hot water line 106, which is in communication with the shower discharge port, lowers. In the aforementioned shower apparatus, the water in the third hot water line 106 cannot be disposed of during use of the shower. Therefore, when the shower is next used, the residual low temperature hot water in the third hot water line is discharged as it is, or the stop valve 112 is closed to stop the use of the shower as described above. Then hot water in both the second and third hot water lines 103 and 106 is removed from the drain valve 109 for disposal, after which new hot water should be introduced. It has taken a long time for such preparation.

Another conventional shower apparatus has been disclosed, for example, in Japanese Utility Model Laid-Open Publication No. 19291/1990, in which several different programs, that define different opening and closing operations of the valves, are stored in a controller section. Operating sections are provided for selecting these programs and a display section is provided for displaying the whole discharge order of the programs. The kinds of showers and the like are provided close to the operating section so that the operating sections are operated in accordance with the display section whereby the programs corresponding thereto are executed. The opening and closing valves are opened for a predetermined time in a predetermined order.

However, in such a conventional shower apparatus, since discharge contents or the like are fixed for every program set in advance in the controller section, the discharge content cannot be suitably changed because of physical condition of a particular user, taste of individuals, etc., posing a problem that a very stiff automatic operation causes an inconvenience during use.

A further conventional shower apparatus is disclosed for example, in Japanese Utility Model Laid-Open Publication No. 70880/1987, in which a body shower is provided which includes a plurality of discharge ports placed vertically on the front surface of a shower tower. An overhead shower is provided which includes downward discharge ports placed at an upper part of the shower tower. An opening and closing valve and a flow adjusting valve are provided in the midst of a hot water passage connected to each discharge port. Hot water is discharged laterally at a perfect rate from the discharge ports of the body shower and pours hot water on the whole body except the head. Hot water is also discharged at a preset rate from the discharge ports of the overhead shower and poured principally on the head.

However, in the conventional shower apparatus as described above, hot water or cold water is merely poured laterally or downwardly towards the lower half of the body. Therefore, the lower half of the body, including the waist, the hips, the thighs the calves, and the soles of the feet, cannot be sufficiently stimulated or massaged from the bottom.

It is then contemplated that an undershower be provided on the shower tower having discharge ports faced upwardly. Hot water could then be upwardly discharged at a preset rate from the discharge ports of the undershower in a fashion similar to the body shower and the overhead shower.

However, in this case, when the discharge of the undershower starts, hot water is suddenly and vigorously discharged from the discharge ports onto the lower half of the body and the soles of feet. As a result, the user is surprised and has a feeling of unrest due to being unfamiliar with the undershower. In addition, a sudden discharge, e.g. caused by an erroneous operation of the operating section, is unpleasantness to user.

BRIEF DESCRIPTION OF THE DRAWINGS

FIGS. 6 and 7 are time charts showing a water-disposal operation of first and second hot water lines;

FIG. 8(A) is a time chart showing a water-disposal cycle of a third hot water line;

FIGS. 8(B) to 8(D) are respective time charts showing an operation of a disposal water control cycle;

FIGS. 9(B) and 9(C) are respective time charts showing one example in case the step is previously fed;

SUMMARY OF THE INVENTION

A first object of the present invention is to provide a shower apparatus having a water disposal construction in which first, second and third hot water lines can be operated independently to carry disposal water and suitable hot water. This allows the preparation time required for the discharged water of the shower to assume a proper temperature, to be shortened. After preparation, hot water at a proper temperature can be discharged for immediate use.

A further object of the present invention is to provide a shower apparatus with a programmed discharge function, in which a programmed discharge content can be changed during an automatic control operation.

Another object of the present invention is to provide a shower apparatus for carrying out an undershower discharge so that particularly the lower half of a user's body, including, e.g., the waist, the hip, the thigh, the calf, and the sole of a foot, are adequately stimulated. A further object is to provide such a shower apparatus that carries out an undershower discharge without suddenly discharging when the undershower discharge starts.

DESCRIPTION OF THE PREFERRED EMBODIMENTS

Figure 1:
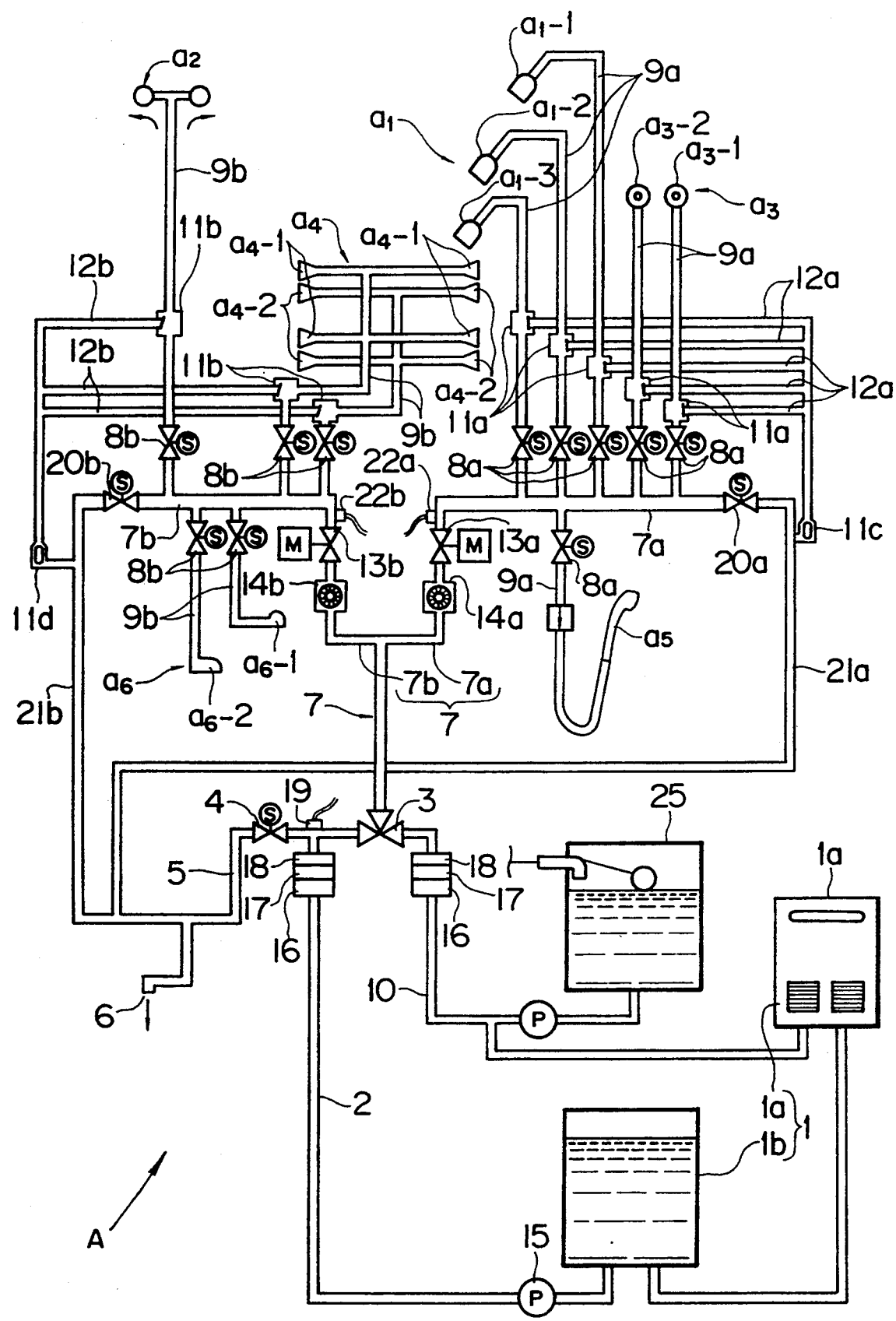
FIG. 1 is a schematic view of a piping system of a shower apparatus to which the present invention is embodied.
Figure 2:
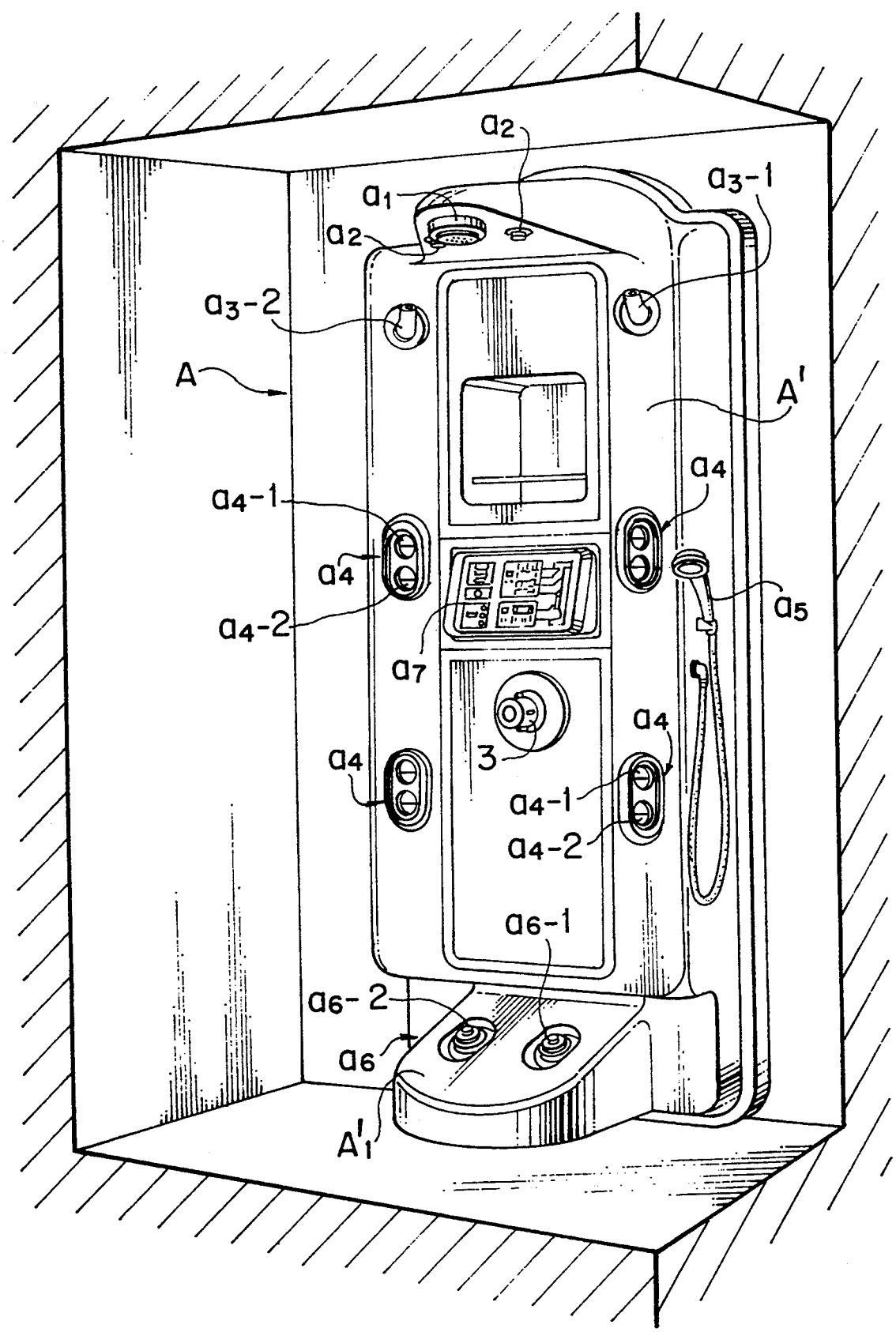
FIG. 2 is a perspective view of the shower apparatus.
Figure 3:
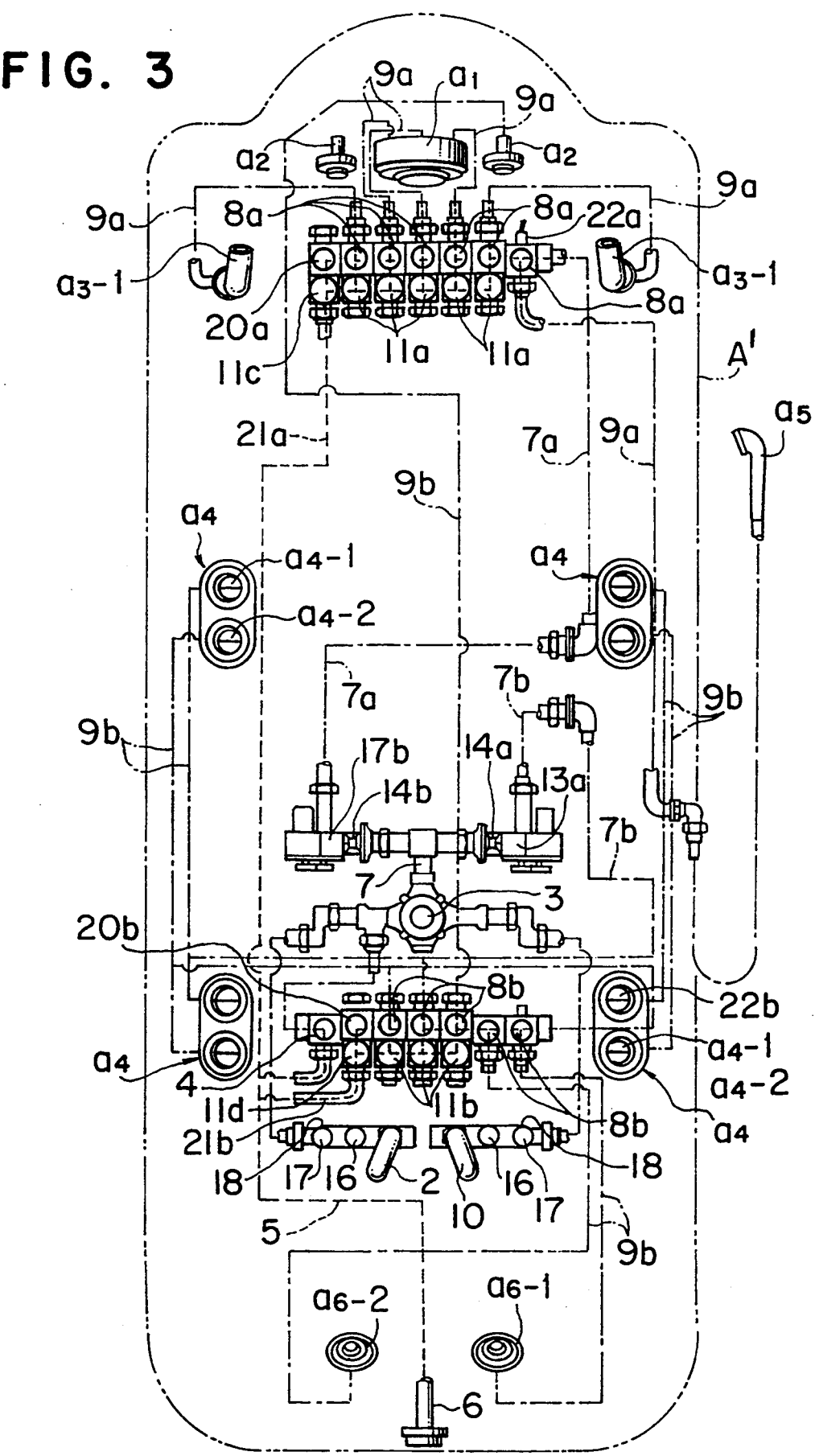
FIG. 3 is a partial view of the piping system of the shower apparatus.

FIGS. 1 to 3 show a shower apparatus A according to an embodiment of the present invention. Various kinds of showers (shower discharge ports) $a_1$ to $a_6$ are provided at side portions and dispersed vertically along a tower body A' in the form of a panel. Discharge of these showers is controlled by a control section 50 (see FIGS. 4(A) to 4(F)). Input means of control section 5D include an operating panel $a_7$ located at the central portion of the front surface of the tower body A'.

FIG. 1 schematically shows the piping system for routing hot water and disposal water through the shower apparatus A. A first hot water line 2 extends from a hot water source 1 to a hot and cold water mixing cock 3. A second hot water line 7, branches into two lines 7a and 7b, and is connected to the secondary (outlet) side of the hot and cold water mixing cock 3. Discharge opening and closing valves (electromagnetic valves 8a and 8b in the present embodiment) are connected in parallel to both branch lines 7a and 7b. Third hot water lines 9a and 9b extend from respective secondary sides of the electromagnetic valves 8a and 8b, to respective shower discharge ports $a_1$ to $a_6$. The actual piping system is partly omitted in FIG. 3.

The shower discharge ports $a_1$ to $a_6$ will now be described. In FIGS. 1 to 3, reference numerals $a_1$-1, $a_1$-2 and $a_1$-3 designate a spray discharge port, massage discharge port and a soft (foam) discharge port, respectively. The three discharge ports are incorporated into a single overhead shower $a_1$ as shown in FIGS. 2 and 3.

A microshower discharge port $A_2$ is arranged on both sides of the overhead shower $a_1$, that discharges shower water in the form of mist.

Discharge ports $a_3$-1 and $a_3$-2, comprise hot water exposing ports, and are faced upwardly on both sides of the tower body A', and release shower water upwardly to thereby fall in the form of beads on a shoulder or the like of a user.

Discharge ports $a_4$-1 and $a_4$-2 comprise a body shower $a_4$. Each body shower $a_4$ comprises two kinds of discharge ports. The first kind being a spray discharge port $a_4$-1 and the second kind being an intermittent (massage) discharge port $a_4$-2. Discharge ports $a_4$ are disposed at each side of the tower body A' and are directed towards a user who stands up in front of the tower body A'.

Discharge ports $a_6$-1 and $a_6$-2 together comprise an undershower $a_6$, and are provided on support-like portions located under the tower body A'. The undershower discharge ports allow the sole of a foot or the like to be massaged by shower water being discharged upwardly.

A hand shower $a_5$ is detachably provided on the side of the tower body A', and may be used to shampoo the hair of the head or the like.

The hot water source 1 may include several types, according to the specification thereof. In one type, hot water is directly supplied from a hot water supply unit $1a$, and in another type, hot water from the hot water supply unit $1a$ is first stored in a hot water tank $1b$ and then supplied. In the case of the present embodiment, the latter is employed, in which hot water heated by the hot water supply unit $1a$ is stored in the hot water tank $1b$, and then increased in pressure through a pressure pump 15, in which state the hot water is supplied from the first hot water line 2 towards the hot and cold water mixing cock 3.

The hot and cold water mixing cock 3 comprises a thermostat mixing valve. The first hot water line 2 is connected to a hot water port of the mixing cock 3. A water supply line 10 is coupled between a water tank 25 and a port of the mixing cock 3. A stop cock 16, a strainer 17 and a check valve 18 are provided, in that order, upstream of the mixing cock 3 in the first hot water line 2 and upstream of mixing cock 3 in the water supply line 10.

Hot water is mixed to the desired temperature by the hot and cold water mixing cock 3, and is supplied into the branched lines $7a$ and $7b$ of the second hot water line 7. When the electromagnetic valves $8a$ and $8b$ are opened, hot water is discharged from the shower discharge ports $a_1$–$a_6$ through the third hot water lines $9a$ and $9b$.

In the shower apparatus A of the present embodiment, the first hot water line 2 and the second hot water line 7 are independently provided with the water disposal construction of the flow system. The third hot water lines $9a$ and $9b$ are provided with the water disposal construction of the water removal system.

First, a drain valve 4 for water disposal is connected to the first hot water line 2 at a location directly before the hot water port of the hot and cold water mixing cock 3.

Figure 4A:
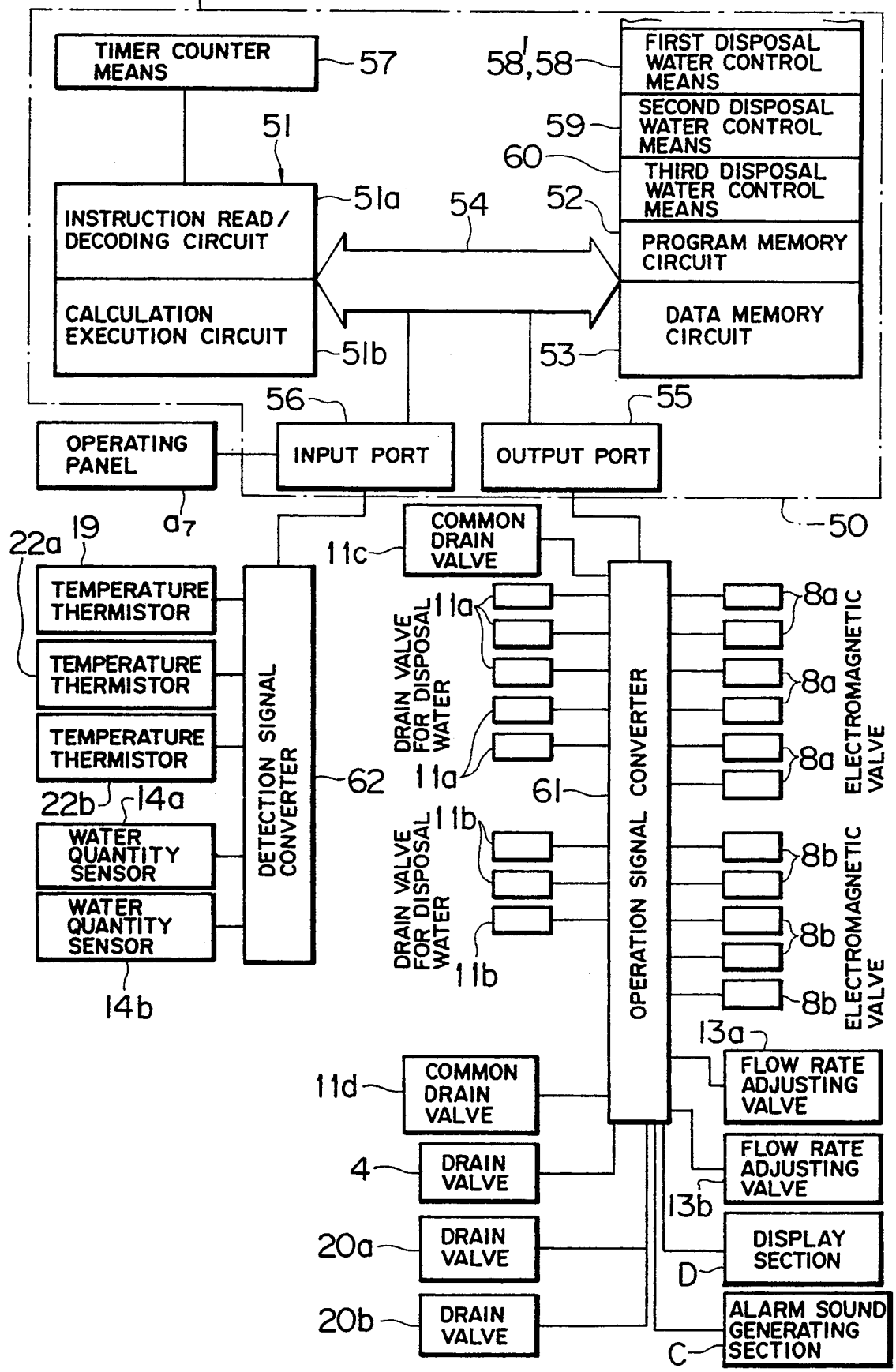
FIG. 4(A) is a block diagram showing the relationship between an operation control section, an electromagnetic valve, a drain valve and a temperature thermistor.

Opening and closing of the drain valve 4 is controlled by a control section 50 (see, e.g., FIG. 4A). A drain line 5 is connected to a secondary side of the drain valve 4, and communicates with a drain port 6 that is disposed at the lower part of the shower apparatus A.

A temperature thermistor 19, coupled to the control section 50, is provided to control the opening and closing operation of the drain valve 4, and is located immediately upstream from the drain valve 4 of the first hot water line 2. The temperature of hot water in the first hot water line 2 is thereby measured by the temperature thermistor 19, and the measured information is transmitted to the control section 50.

The hot water supplied from the first hot water line 2 to the hot and cold water mixing cock 3 is mixed by mixing cock 3 with water from the water line 10, to a suitable temperature desired by a user, and the hot water is allowed to flow into the second hot water line 7.

The second hot water line 7 is branched into a plurality of lines including, for example, two branch lines $7a$ and $7b$. Both branch lines $7a$ and $7b$ comprise water-quantity sensors $14a$ and $14b$ for measuring the flow rate of hot water passing through the branch lines $7a$ and $7b$, flow rate adjusting valves $13a$ and $13b$ for adjusting the flow rate, and temperature thermistors $22a$ and $22b$ for measuring temperatures of hot water in the branch lines $7a$ and $7b$ from an upstream side.

Branch line $7a$ is connected to six diaphragm type electromagnetic valves $8a$ for opening and closing three overhead shower discharge ports $a_1$-1, $a_1$-2, $a_1$-3, exposing hot water discharge ports $a_3$-1, $a_3$-2, and the hand shower $a_5$. The other branch line $7b$ is connected to five diaphragm type electromagnetic valves $8b$ for opening and closing the microshower discharge port $a_2$, undershower discharge ports $a_6$-1, $a_5$-2 and body shower discharge ports $a_4$-1, $a_4$-2.

The showers $a_1$–$a_6$ are divided into two systems. The first system comprises ports $a_1$, $a_3$ and $a_5$ which are coupled to the branch line $7a$ of the second hot water line 7, and the second system comprises ports $a_2$, $a_4$ and $a_6$ which are coupled to the branch line $7b$. For example, when the desired electromagnetic valves $8a$ and $8b$ are opened one by one, the showers that are coupled to the different branch lines $7a$ and $7b$ such as the overhead shower $a_1$, the body shower $a_4$, the hand shower $a_5$ and the body shower $a_4$, are simultaneously discharged. The flow rate of hot water supplied to both of the branch lines $7a$ and $7b$ is adjusted by automatic control of the flow adjusting valves $13a$ and $13b$ to the optimum flow rate to correspond to the kind of the shower discharge ports $a_1$ to $a_6$ opened in the branch lines $7a$ and $7b$.

Drain valves $20a$ and $20b$ comprise, for example, electromagnetic valves or the like, and are provided at a downstream end of each of the branch lines $7a$ and $7b$ of the second hot water line 7. Second drain lines $21a$ and $21b$ are connected to the secondary side of valves $20a$, $20b$ and are connected to the drain line 5.

Drain valves $11a$ and $11b$ are provided for disposing of water, and comprise, for example, electromagnetic valves or the like. They are provided at a downstream side of the electromagnetic valves $8a$ and $8b$ in the third hot water lines $9a$ and $9b$, which extend between the electromagnetic valves $8a$ and $8b$ and the shower discharge ports $a_1$–$a_6$. Third drain lines $12a$ and $12b$ are connected to the secondary side of the drain valves $11a$ and $11b$, and are gathered and coupled with second drain lines $21a$ and $21b$ through common drain valves $11c$ and $11d$.

The common drain valves $11c$ and $11d$ comprise backflow prevention valves, which are opened following the drain valves $11a$ and $11b$ to discharge the collected drain into the second drain lines $21a$ and $21b$.

In FIG. 1, some drain valves $11a$ and $11b$ are not depicted as being positioned immediately downstream of the electromagnetic valves $8a$ and $8b$, for the purpose of simplicity. However, as shown in FIG. 3, the electromagnetic valve $8a$ is of the diaphragm type and the drain valve $11a$ comprises an electromagnetic valve of the direct-driven type, and similar electromagnetic valve $8a$ and the drain valve $11b$ are respectively integrally formed into a unit, which is connected in a lateral row.

Each of the electromagnetic valves $8a$, $8b$, the flow adjusting valves $13a$, $13b$ and the drain valves 4, $20a$, $20b$, $11a$, $11b$ are electrically coupled with the control section 50 which performs an input operation from the operating panel $a_7$ that is located in the central portion of the tower body A' as described above. Disposal of water in the first, second and third hot water lines 2, 7, 9a and 9b and discharge from the shower discharge ports $a_1$-$a_6$ are controlled by the control section 50.

FIG. 4(A) is a block diagram showing the connection between the control section 50 and the electromagnetic valves 8a, 8b, water disposal drain valves 4, 20a, 20b, 11a, 11b, temperature thermistors 19, 22a, 22b and the like.

Figure 4B:
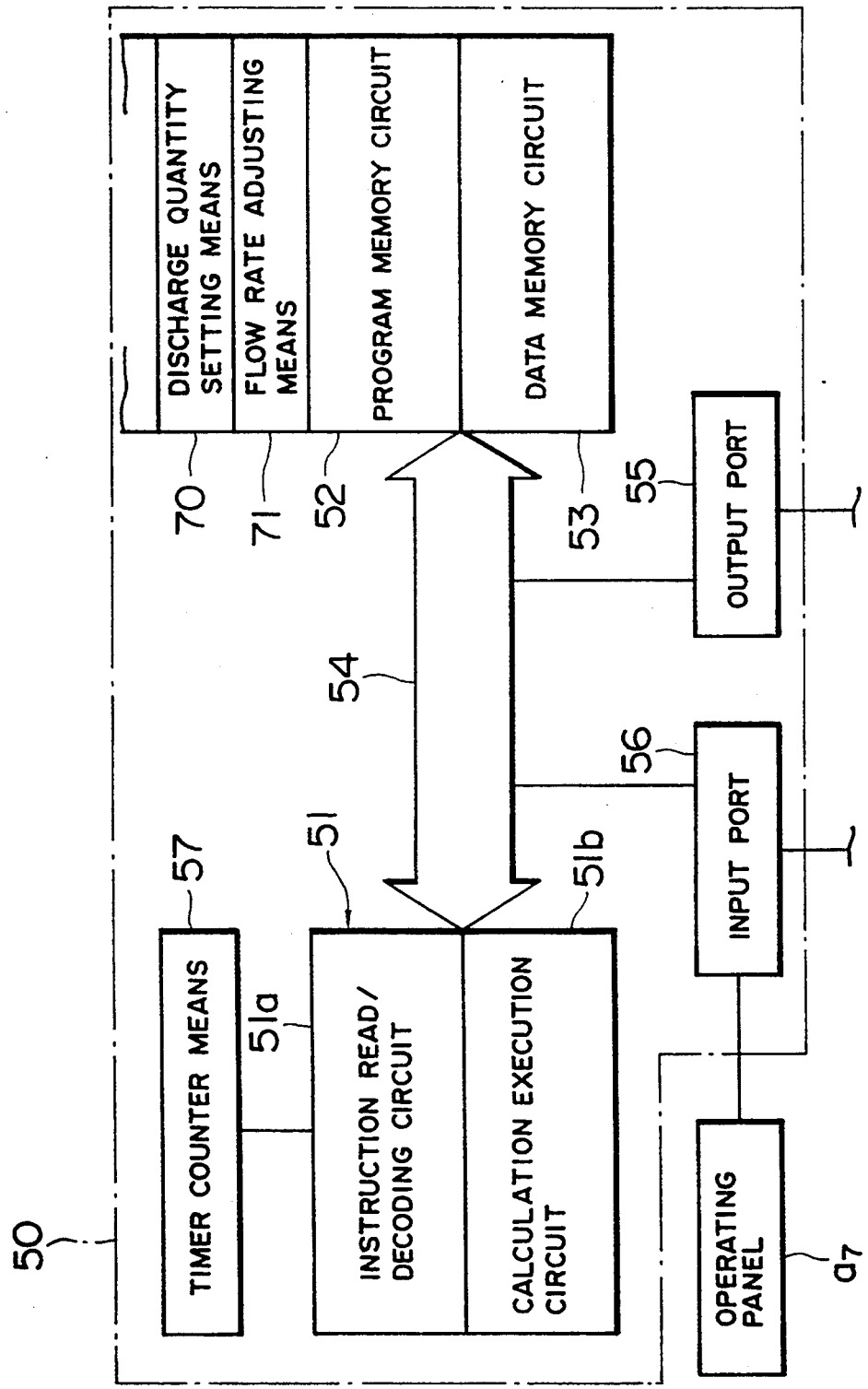
FIGS. 4(b) to 4(f) are respective block diagrams showing various means provided on the control section.

A central processing unit 51 is provided which comprises an instruction read and decoding circuit 51a, a calculation and execution circuit 51b and timer counter means 57. The operation control section 50 causes central processing unit 51 to communicate with a memory circuit section through a data bus 54. The memory circuit section comprises a program memory circuit 52 for storing basic control programs of the shower apparatus A and a data memory circuit 53 for writing and reading data. The memory circuit section is partly parallel with a first water disposal control means 58, a second water disposal control means 59 and a third water disposal control means 60, which are described later, and many other control means as shown in FIGS. 4(B) and 4(F).

Further, an input port 56 and an output port 55 are each connected to the data bus 54. An operating panel $a_7$ is provided for carrying out operations such as discharge, stopping and flow control of showers. Operating panel $a_7$ and a detection signal converter 62 are each connected to the input port 56 whereas an operation signal converter 61 is connected to the output port 55.

Several devices are connected to the detection signal converter 62, including a temperature thermistor 19 of the first hot water line 2, temperature thermistors 22a and 22b of both branch lines 7a and 7b of the second hot water line 7, and water quantity sensors 14a, 14b provided on both branch lines 7a and 7b, respectively. Detection signals representing values including a hot water temperature and flow rate are obtained as analog values, converted into digital values, and are forwarded to the input port 56 of the control section 50.

When the detection signal of the hot water temperature or flow rate is inputted into the input port 56, the central processing unit 51 uses the detection signal as a reference, and repeatedly executes reading, decoding and calculation on the basis of the basic program and the first, second and third water disposal control means 58, 59 and 60. As a result, the CPU 51 outputs the operation signal towards the output port 55 when necessary. The operation signal is outputted in digital form to the output port 55, and is converted into analog form by the operation signal converter 61. The converted signal is further amplified, and thereafter applied to predetermined electromagnetic valves 8a, 8b coupled to the converter 61.

Several mechanisms are connected to the operation signal converter 61, including a drain valve 4 of the first hot water line, drain valves 20a and 20b of both branch lines 7a, 7b of the second hot water line 7, common drain valves 11c, 11d, flow rate adjusting valves 13a, 13b, six electromagnetic valves 8a on the side of the branch line 7a, five water disposal drain valves 11a, five electromagnetic valves 8a on the side of the branch line 7b and three water disposal drain valves 11b.

Figure 5:
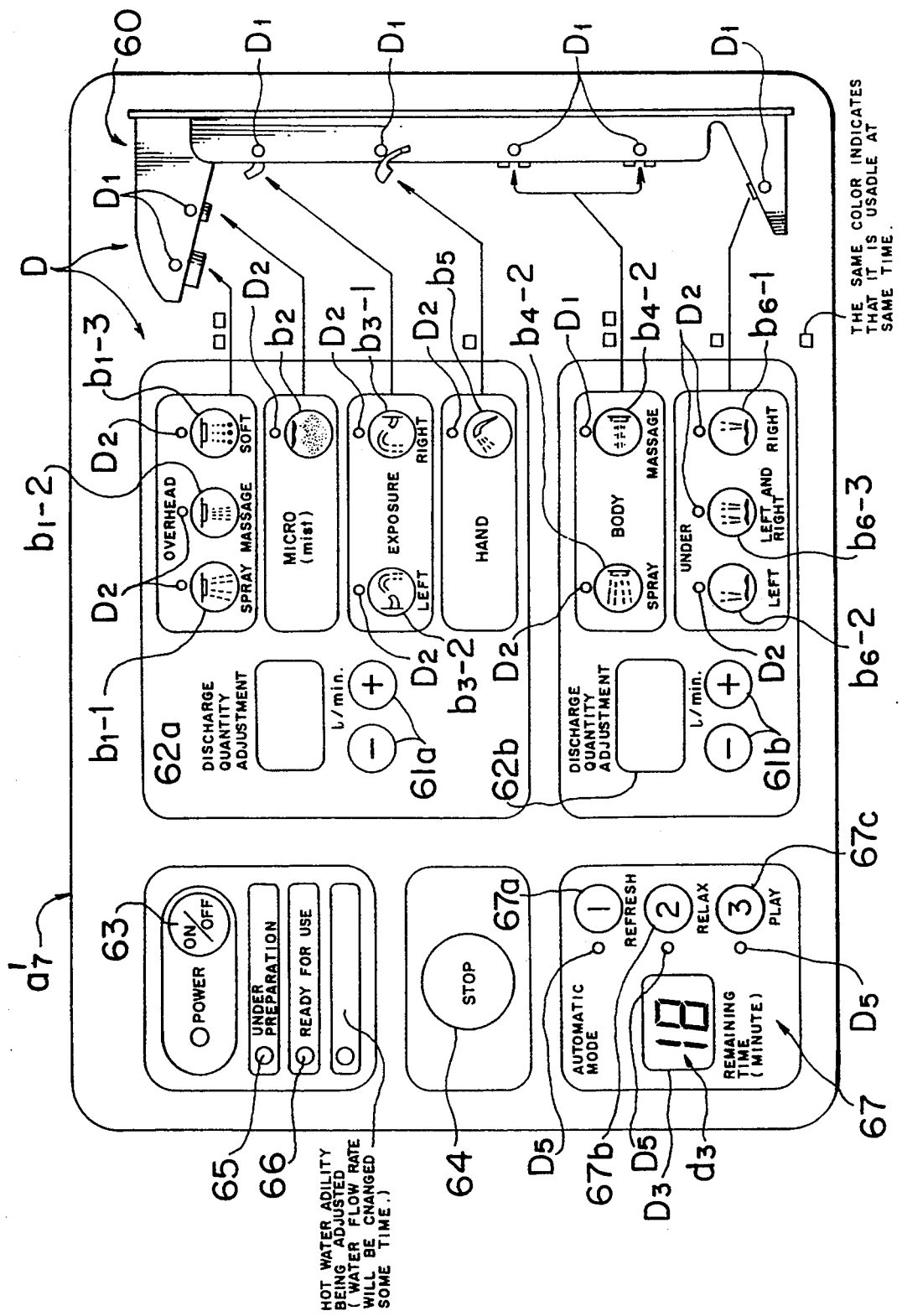
FIG. 5 is a front view of an operating panel.

FIG. 5 shows a panel surface $a_7'$ of an operating panel $a_7$, in which a rough picture 60 of the shower body A' is depicted on the right side on the panel. Water discharge operating switches $b_1$ to $b_6$ corresponding to discharges from shower discharges $a_{1-1}$-$a_{6-2}$ are arranged in the central portion of the panel surface $a_7'$.

Reference numerals 61a and 61b designate discharge quantity adjusting buttons. The buttons 61a and 61b (+ and —) are depressed whereby the discharge quantity per minute of shower use is adjusted, and the discharge quantity is displayed on discharge amount display sections 62a and 62b. On the left side of the panel surface, numeral 63 designates a power switch, and 64 is a stop water switch for use in emergency.

For each of the aforesaid switches $b_1$ to $b_6$ and 63, a toggle type switch which repeatedly assumes ON and OFF positions for every depressing operation, can be provided.

When using the shower, if the power source 63 of the operating panel $a_7$ is turned "ON", the operation control section 60 is started so that the temperature thermistors 19, 22a and 2b and the water quantity sensors 14a and 14b start the detection of the hot water temperature and flow rate in the respective hot water lines.

On the other hand, as time passes since the shower was previously used, the temperature of the hot water remaining in the first and second hot water lines 27 becomes lower.

The first water disposal control means 58 of the control section 50 has the function, which the case where the hot water temperature of the first hot water line 2 is less than a predetermined level, for example, less than 47° C.±3° C., of opening the drain valve 4 so that new hot water from the hot water source 1 is disposed from the drain line 5 till the hot water in the first hot water line 2 assumes a temperature in the range of 47° C.±3° C.

Figure 6:
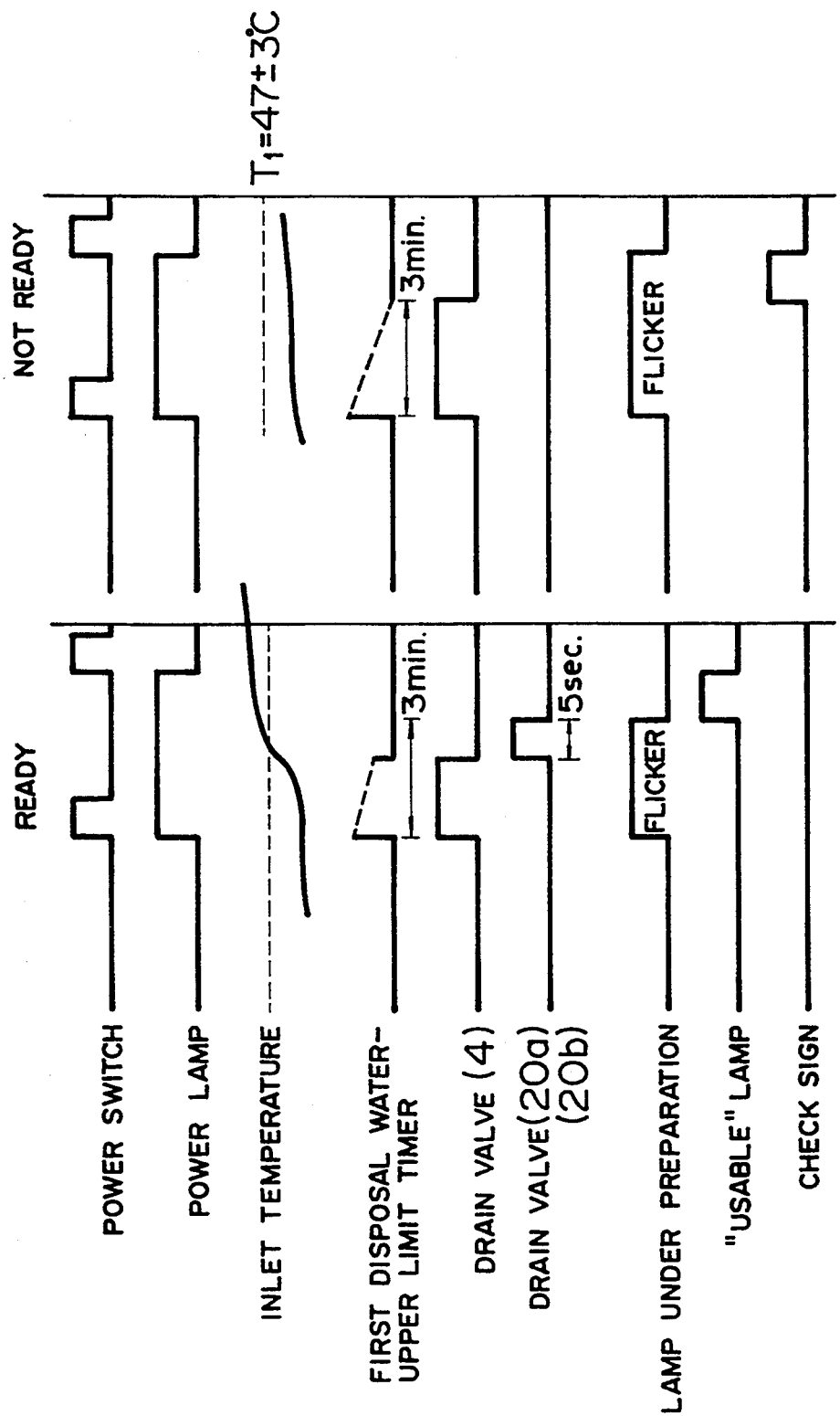

Thereby, as shown in the time chart of FIG. 6, when the power switch 63 is "ON", the detection temperature by the temperature thermistor 19 of the first hot water line 2 is less than 47° C.±3° C. The first disposal control means 58 of the control section 50 is executed to output the operation signal by which the drain valve 4 is opened. When the drain valve 4 is opened, the low temperature water in the first hot water line 2 is disposed directly before the hot water port of the hot and cold water mixing cock 3 and drained outside from the drain port 6 through the drain line 5.

When water is disposed so that low temperature hot water is extruded by new hot water, and hot water in the first hot water line 2 is replaced by new hot water sent from the hot water tank 1b, the hot water temperature in the first hot water line 2 rises to a predetermined level as described above. When the operation control section 50 knows it by the presence of the detection signal from the temperature thermistor 19, the first water disposal control means 58 outputs an operation signal by which the drain valve 4 is closed to terminate the disposal of water.

As described above, the water disposal in the first hot water line 2 causes the low temperature hot water remaining in the first hot water line 2 to be replaced by new hot water from the hot water source 1 by opening the drain valve 4 directly before the hot and cold water mixing cock 3. As compared with the conventional circulation system, the construction is considerably simplified by a portion in which a circulation mechanism is not necessary. It is possible to exchange hot water having a predetermined temperature directly before the hot and cold water mixing cock 3 in a short period of time and to positively prevent low temperature water from being mixed.

The first water disposal control mechanism 58 may be provided with a water disposal stop device which is provided for defective operation of the hot water supply unit 1a. When disposing water in the first hot water line 2, when the hot water in the first hot water line 2 does not reach the aforesaid predetermined temperature within a predetermined time due to the defective operation of the hot water supply device 1a or the like, the drain valve 4 is closed to stop the disposal of water. For example, when the opening time of the drain valve 4, that is, the water disposal time, reaches three minutes, and the temperature of hot water in the hot water line 2 does not rise to 47° C.±3° C., there is a possibility of occurrence of defective operation of the hot water supply unit 1a. Therefore, at that time, the first water disposal control means 58' stops the disposal of water (FIG. 6—Defective preparation).

Accordingly, if the aforementioned first water disposal control mechanism 58' is provided, in the state where the hot water from the first hot water line 2 is supplied at a low temperature or in the form of water due to the defective operation of the hot water supply unit 1a, it is possible to prevent inconveniences in operation wherein disposal of water from the drain valve 4 of the first hot water line 2 is continuously carried out.

As described above, in the case where disposal of water in the first hot water line 2 is terminated as scheduled and the hot water in the hot water line 2 is maintained at a predetermined temperature, the second water disposal control mechanism 59 of the control section 50 is continuously executed.

The second water disposal control mechanism 59 performs a control function such that when the hot water temperature in the first hot water line 2 is maintained at a predetermined level, the drain valves 20a and 20b of the second hot water line 7 are opened for a predetermined time, or the drain valves 20a and 20b are opened till the hot water in the line 2 reaches a predetermined temperature to effect disposal of water.

The second water disposal control mechanism 59 in the present embodiment outputs an operation signal by which both drain valves 20a and 20b of the branch lines 7a and 7b are opened for a predetermined time, for example, for 5 seconds, simultaneously with the opening of the drain valve 4 to dispose water from both second drain lines 21a and 21b. Hot water in both the branch lines 7a and 7b is thereby replaced by new hot water from the hot and cold water mixing cock 3 (FIG. 6).

The aforesaid opening time of the drain valves 20a and 20b is determined by experimentally measuring in advance the time needed to replace the residual hot water in the branch lines 7a and 7b of the second hot water line 7 with new hot water, the time in the present embodiment being set to five seconds.

Alternatively, the replacement of the hot water in the second hot water line 7 can be accomplished by continuously disposing of water till the hot water temperature in the branch lines 7a and 7b reaches the aforesaid predetermined temperature (for example 33° C.±3° C.). The hot water temperature in the branch lines 7a and 7b detected by the temperature thermistors 22a and 22b is thus used as a reference for control.

As described above, the disposal of water in the second hot water line 7 is accomplished by the discharge of water from the drain valves 20a and 20b at the downstream end of both branch lines 7a and 7b simultaneously with the supply of new hot water from the hot and cold water mixing cock 3. Therefore, there is an advantage in that the control management of the water disposal operation can be carried out relatively easily regardless of time management or temperature management.

It is possible to replace the residual hot water in both branch lines 7a and 7b with hot water having an optimum temperature, for example, even by making piping conditions of both branch lines 7a and 7b constant so that the disposal of the low temperature hot water remaining in the branch lines 7a and 7b is carried out for a predetermined time by control of time management alone.

According to the above-described proposal, the temperature thermistors 22a and 22b are not required, and the construction and operation control section can be simplified accordingly.

An in-preparation lamp 65 on the operating panel a7 flickers during disposal of water in both first and second hot water lines 2 and 7, and upon termination of the disposal of water, a "usable" lamp 66 is lit.

According to a partial modification of the second water disposal control means 59, the disposal of water in the second hot water line 7 can be separately executed for both branch lines 7a and 7b. For example, where only the hot water in the branch line 7a is at a low temperature less than a predetermined level, the drain valve 20a can be opened by itself to effect the disposal of water in the branch line 7a, and at the same time, water can be discharged from the showers $a_2$, $a_4$, and $a_6$ that are coupled to branch line 7b.

The operation control of water disposal from both the first and second hot water lines 2 and 7 is carried out when the shower apparatus A is initially started. Both the first and second water disposal control mechanisms 58 and 59 function as shown in the time chart of FIG. 7. In the case where the power source remains ON for a fixed time even after termination of a previous shower use when the hot water temperature in the first hot water line 2 is estimated to be lower than a predetermined temperature, the water disposal of the first and second hot water lines 2 and 7 is executed in a manner similar to that described above so that the hot water in both the first and second hot water lines 2 and 7 is maintained at a temperature level above a predetermined temperature. The final time may be, for example, 10 minutes after the water discharge operating switches $b_1$-1 to $b_6$-3 of showers are finally depressed to stop the water of the previous shower.

It is noted that if water disposal from first hot water line 2 is continued for three minutes, and the hot water temperature in the hot water line 2 does not reach a predetermined temperature, water is stopped in a manner similar to that described above (FIG. 7—repreparation is defective).

In the shower device A of the preferred embodiment of the present invention, even if the temperature of the hot water in the first hot water line 2 is kept above a predetermined value, the drain valves 20a and 20b are opened and the water of the second hot water line 7 is disposed of when the water discharge operation switches $b_1$-1 to $b_6$-3 are depressed to use the shower. When the hot water temperature within either the branch line 7a or 7b of the second hot water line 7 is less than a predetermined value, for example, when the body shower $a_4$ is used with hot water, after the overhead shower $a_1$ is used with cold water, the body shower $a_4$ is used with hot water and then the water disposal operation switches $b_1$-1 to $b_6$-3 of the overhead shower $a_1$ are depressed or the like.

As described above, the second hot water line 7 comprises an independent water disposal system line divided into separate branch lines 7a and 7b, so that water can be disposed of for a predetermined time from the drain valves 20a and 20b at the downstream ends of both the branch lines 7a, 7b while supplying hot water, having an optimum temperature, from the hot and cold water mixing cock 3. Therefore, it is possible to replace the low temperature residual hot water with optimum temperature hot water. Hot water having an optimum temperature can be promptly discharged after performing these preparation steps.

When after the power source has been tuned ON, the water disposal of both the first and second hot water lines 2 and 7 is terminated and the preparation is completed, the "usable" lamp 66 is lit so that the shower operating switches $b_1$-1 to $b_6$-3 of the operating panel $a_7$ become effective. Thereafter, by depressing one of the water disposal switches $b_1$-1 to $b_6$-3 of the showers as desired, the control section 50 outputs an operation signal for opening the electromagnetic valves 8a and 8b of the shower discharge ports $a_{1\text{-}1}$–$a_{6\text{-}2}$ as desired so that the optimum temperature hot water in the second hot water line 7 is immediately discharged.

Since the hot water pressure from the hot water source 1 is limited, the shower apparatus A, in the present embodiment, can be used while switching the showers $a_1$ to $a_6$ so that any combination of them can be used according to the user's taste. While the combination or switching operation of these showers can be carried out manually by the user, in the present embodiment, several discharge programs, for example, three programs, can be incorporated in advance into the control section 50 to select and execute automatic mode switches 67a, 67b and 67c of the operating panel $a_7$. Thereby, discharges from the showers $a_1$ to $a_6$ can be connected as intended, and an effective shower bath can be easily enjoyed.

Moreover, since the shower discharge ports $a_1$-1 to $a_6$-2 are different in kind, the optimum discharge quantities are also different according to the respective discharge ports. Thus, the shower apparatus A, according to the present embodiment, controls adjustment of the flow rate adjusting valves 13a and 13b while the quantity of water flowing through the branch lines 7a and 7b is detected by the water quantity sensors 14a and 14b. The flow is controlled so that the optimum quantity of hot water is discharged from the shower discharge ports $a_1$-1 to $a_6$-2.

The quantity of discharge from the shower discharge ports $a_1$-1 to $a_6$-2 is maintained at the optimum flow rate during the discharge, and the value thereof is displayed on the water disposal amount display sections 62a and 62b. However, the + and − buttons 61a and 61b are depressed to change the discharge set value to a value as desired, whereby the control section 50 outputs an operation signal for increasing or decreasing an opening degree to the flow rate adjusting valves 13a and 13b to realize the set discharge quantity on the water disposal amount display sections 62a and 62b, while interpreting detected signals of water amount sensors 14a, 14b.

When use of the shower is stopped, hot water which has not been discharged from the shower discharge ports, will remain within the third hot water lines 9a and 9b of the shower discharge ports $a_4$-1 and $a_4$-2 except the undershower $a_6$ and the hand shower $a_5$. However, the control section 50 opens the drain valves 11a and 11b corresponding to the showers after the shower is stopped to dispose the residual water.

The control section 50 controls the opening of the drain valves 11a, 11b of the third hot water lines 9a and 9b of the showers $a_1$ to $a_6$ and the common drain valves 11c and 11d every time after use so as to dispose hot water remaining in the third hot water lines 9a and 9b.

Thus, for example, when the showers $a_1$, and $a_5$ and the showers $a_2$, $a_4$, and $a_6$ are each simultaneously discharged under a selection of the automatic mode switches 67a, 67b and 67c, by depressing each of them, the operation is continued while successively switching the combination of these shower discharges. The third water disposal control mechanism 60 outputs an operation signal for opening the drain valves 11a and 11b of the shower discharge ports $a_1$-1 to $a_6$-2 with the electromagnetic valves 8a and 8b closed, and the common drain valves 11c and 11d for a predetermined time.

The third water disposal control means 60 forms two systems A and B of water cycles as shown in FIG. 8 after the power source is turned ON.

Both the water disposal cycles A and B may, e.g., have a cycle of one period (40 seconds) consisting of an operation period (10 seconds) and a stop period (30 seconds). Both cycles simultaneously progress with a phase difference by a ½ period as shown.

The water disposal of the showers $a_1$, $a_3$ and $a_5$ (on the branch line 7a side of the second hot water line 7) is executed within the operation period of 10 seconds immediately after the stoppage of water in the water cycle A. The water disposal of the showers on the branch line 7b side is executed within the operation period immediately after the stoppage of water in the water cycle B.

The operation signal outputted from the third disposal control mechanism 60 is executed within the operation period of 10 seconds in both the water disposal cycles A and B so that at the time when the drain valves 11a and 11b are opened, initial values of opening time corresponding to the shower discharge ports $a_1$-1 to $a_6$-2 are placed on operation counters 7a-n and 7b-n assigned to the drain valves 11a and 11b and immediately thereafter, substraction is made, for example, per second. At the time when the operation counter is zero, the opened drain valves 11a and 11b are closed (FIG. 8(A)).

As described above, the third disposal control mechanism 60 generates an output signal only in its operation period to open the drain valves 11a and 11b, but has three operation cases as follows:

In the first case, a shower is stopped at the stop period of the water disposal control cycles A and B. The drain valves 11a and 11b are opened simultaneously with the start of the operation period of the next cycle to discharge water, and upon the termination of drainage, the drain valves 11a and 11b are closed to stop drainage (FIG. 8(B)).

In the second case, the showers $a_1$ to $a_6$ are stopped at the operation period of the water disposal control cycles A and B. The drain valves 11a and 11b are opened simultaneously with the stoppage of the showers and water is drained during the operation period. A portion having not been drained during the operation period is drained by opening the drain valves 11a and 11b again at the operation period of the next cycle (FIG. 8(C)).

In the third case, the discharge is started again from the same showers $a_1$ to $a_6$ during the drainage. The drain valves 11a and 11b are closed simultaneously with the start of discharge to stop the drainage, and the drain valves $11a$ and $11b$ are again opened at the operation period after stoppage of water to drain water (FIG. 8(D)).

The time of drainage is controlled by operation counters $7_{a-n}$ and $7_{b-n}$ corresponding to the drain valves $11a$ and $11b$, as described above, so that counted values from the start of drainage are subtracted at intervals of one second, and when zero is reached, the drainage is completed. The operation counters $7_{a-n}$ and $7_{b-n}$ are designed so that when the operation period is terminated before the counted value assumes zero, counted values are subtracted over the operation period of the succeeding cycle.

When the discharge from the showers $a_1$ to $a_6$ of the third hot water lines $9a$ and $9b$, which are coupled to the third drain lines $12a$ and $12b$, is restarted, during counting, the operation counters $7_{a-n}$ and $7_{b-n}$ return the count to the initial value and again start count-down from the initial value after stoppage of water.

The disposal of water from the showers $a_1$, a and $a_5$ in the branch line $7a$ system and that of the showers $a_2$, $a_4$ and $a_6$ in the branch line $7b$ system are carried out apart from each other, so that operation and control of drain valves $11a$, $11b$ and electromagnetic valves $8a$, $8b$ will be simplified. The stop period of the aforementioned water disposal cycles A and B can be shortened about 10 seconds for each period; in this case, each period can be shortened to about 20 seconds.

As described above, the drain valves $11a$ and $11b$ of the third hot water lines $9a$ and $9b$ are individually independently operated by the operation control of the water disposal control mechanism 60 so that the hot water remaining in the third hot water lines $9a$ and $9b$ is disposed for every shower for which discharge is stopped.

Therefore, it is not necessary to dispose the hot water in the third hot water line through the second hot water line as in the prior art. Water is disposed while successively continuing the use of the showers $a_1$ to $a_6$, and while water in the third hot water lines $9a$ and $9b$ of showers for which discharge is stopped is disposed, so as to be provided for next use when the interior of the hot water lines $9a$ and $9b$ is empty. Thereby, water can be immediately discharged when using showers without admixture of low temperature hot water from any shower and temperature drop with the passage of time.

The second hot water line in the aforementioned shower apparatus need not be branched, but rather may comprise a single system line and a downstream drain valve. If the second hot water line is designed to be a single system line, a single hot water line may be used to connect the opening and closing valves and shower discharge ports, so that amount of piping and total shower discharge may be reduced. Thus, the hot water system line and the water disposal system line can be advantageously simplified. Furthermore, the replacement of water disposal in the second hot water line with hot water can be positively carried out, similar to the arrangement wherein the second hot water line is branched as described above.

In the shower apparatus of the present embodiment, the water disposal construction and water disposal system are provided on the first, second and third hot water lines 2, 7, $9a$ and $9b$ but according to the essence of the present invention, the water disposal construction and water disposal system similar to those as described above may be provided only for the first and second hot water lines 2 and 7. The thus constructed shower apparatus has exactly similar effect to that of the first and second hot water lines 2 and 7 provided for the shower apparatus according to the present embodiment.

For example, in the above-described first embodiment, the water disposal construction of the water removal system is provided also on the third hot water lines $9a$ and $9b$ in order not to discharge a small quantity of residual hot water remaining in the third hot water lines $9a$ and $9b$. However, in the case where no problem involves in the residual hot water present in the electromagnetic valves $8a$ and $8b$ onward, such as in the cases where third hot water lines $9a$ and $9b$ are relatively short, where the shower discharge ports $a_1$-1 and $a_6$-2 are directly connected to the electromagnetic valves $8a$ and $8b$, or where piping is provided so that hot water is not remaining in the third hot water lines $9a$ and $9b$, it is not necessary to provide a water disposal structure for the remained hot water subsequent to the electromagnetic valves $8a$, $8b$ and it is possible for only the water disposal construction and water disposal system of the first and second hot water lines 2 and 7 to immediately discharge hot water having an optimum temperature without being mixed with low temperature water from the shower discharge ports $a_1$-1 and $a_6$-2.

Moreover, a water disposal stop device may be added to first water disposal device of the shower apparatus in which the water disposal construction and water disposal system are provided on the first and second hot water lines 2 and 7 as described above. According to this, in the case where the hot water in the first hot water line 2 is not at a predetermined temperature due to the defective operation of the hot water supply unit $1a$, which is similar to the shower apparatus according to the present embodiment, it is possible to stop disposal of water from the drain valve 4.

As previously mentioned, with the shower apparatus A of the present embodiment, it is possible to use any one of the showers $a_1$-1 to $a_6$-2 and to use two switches out of the discharge operation switches $b_1$-1 to $b_6$-3, that are simultaneously depressed in combination with the overhead showers $b_1$-1 to $b_1$-3 and the body showers $b_4$-1 to $b_4$-2, the hand shower $b_5$ and body shower $b_4$-1 to $b_4$-2, $a_4$ and the undershowers $b_1$-1 to $b_6$-3 and overhead showers $b_1$-1 to $b_6$-3 causing simultaneous discharge of hot water from one of the showers $a_1$, $a_5$, that are supplied with hot water from the branch line $7a$ side and the showers $a_4$, $a_6$ that are supplied with hot water from the branch line $7b$ side.

The left and right discharge ports $a_6$-1 and $a_6$-2 of the undershower $a_6$ can be simultaneously or separately discharged, and the left and right discharge ports $a_3$-1 and $a_3$-2, for disposing hot water, can be alternately or simultaneously discharged. For example, when a user depresses the discharge operating switch $b_1$-1 of the overhead shower $a_1$, the electromagnetic valve $8a$ of the spray discharge port $a_1$-1 in the overhead shower $a_1$ is opened, so that hot water having the optimum temperature within the branch line $7a$ is discharged in the form of spray from the spray discharge port $a_1$-1, and at the same time, a preset value of 15 l/min. is displayed on the discharge quantity, display section $62a$.

The control section 50 has one aspect shown in FIG. 4(B) in addition to that shown in FIG. 4(A). This comprises a discharge quantity setting means 70 and flow rate adjusting means 71, which are arranged in parallel with the water disposal control means 58, 59 and 60 in a part of the memory circuit.

The aforesaid present value is the optimum discharge quantity set corresponding to individual shower discharge ports $a_1$-1 and $a_6$-2 by the discharge quantity setting means 70 in the control section 50. In the case of the shower apparatus A, according to the present embodiment, the discharge quantities are preset to values shown in the following Table. The preset values are normally changed, but the discharge quantities from the shower discharge ports $a_1$-1 and $a_6$-2 can be changed in set value by depressing the + and − buttons 61$a$, and 61$b$ in the range allowed by the discharge function, and in the range of 2 to 5 l/min. in the present embodiment.

TABLE

| Shower | Preset value |
|---|---|
| Overhead shower | |
| Spray | 15 l/min. |
| Massage | 17 l/min. |
| Foam | 18 l/min. |
| Mist shower | 7 l/min. |
| Exposing hot water | 18 l/min. |
| Body shower | |
| Spray | 20 l/min. |
| Massage | 18 l/min. |
| Under shower | 8 l/min. |
| Hand shower | 12 l/min. |

For example, when the discharge operating switch $b_1$-1 of the spray discharge in the overhead shower $a_1$ is depressed, the discharge starts and at the same time, the preset value of 15 l/min. is displayed on the discharge quantity display section 62$a$. In that state, flow rate adjusting mechanism 71 of the control section 50, from the spray discharge port $a_1$-1, functions as will be described later, whereby hot water having an optimum temperature in a quantity of 15 l/min. is discharged in the form of spray. When the user depresses the button 61$a$ to change it to 18 l/min., the discharge quantity setting mechanism 70 sets the value of the discharge quantity corresponding to the spray discharge port $a_1$-1 of the overhead shower to 18 l/min.

The discharge quantity setting mechanism 70 also controls the set values of discharge quantities corresponding to other shower discharge ports $a_1$-2 to $a_6$-2 similar to the aforesaid spray discharge port $a_1$-1. The discharge operating switches $b_1$-1 to $b_6$-3, corresponding to the shower discharge port as desired, are depressed to start the shower discharge. From that state, the + and − buttons 61$a$ and 61$b$ are depressed. The set values of the discharge quantities corresponding to the shower discharge ports $a_1$-1 to $a_6$-2 can be changed in setting within the predetermined range with the respective preset values as a reference.

On the other hand, the flow rate adjusting means 71 of the control section 60 opens one or two electromagnetic valves 8$a$ and 8$b$, corresponding to the shower discharge or simultaneous discharge ports $a_1$-1 to $a_6$-2, at the time of independent discharge or simultaneous discharge, and always monitors the discharge quantities from the shower discharge ports $a_1$-1 to $a_6$-2, at the time of independent discharge or simultaneous discharge, and always monitors to the discharge quantities from the shower discharge ports $a_1$-1 to $a_6$-2, according to water quantity detection information supplied from the water quantity sensors 14$a$ and 14$b$ of both branch lines 7$a$ and 7$b$. The control section 50 compares the water quantity value, that is, the discharge quantity from the shower discharge ports $a_1$-1 to $a_6$-2 through both branch lines 7$a$ and 7$b$, with the discharge quantity set values of the shower discharge ports $a_1$-1 to $a_6$-2 set by the discharge quantity setting mechanism 70. The opening degree of the flow rate adjusting valves 13$a$ and 13$b$ is controlled according to a difference therebetween to thereby realize the discharge matched to the set values from the shower discharge ports $a_1$-1 to $a_6$-2.

In actual use, when the + and − buttons 61$a$ and 61$b$ are depressed, the aforementioned step is instantaneously executed, and the discharge in the desired water quantity is immediately executed by the shower discharge ports $a_1$-1 to $a_6$-2.

As described above, both flow rate adjusting valves 13$a$ and 13$b$ in both branch lines 7$a$ and 7$b$ are independently controlled in opening degree by the control section 50. Accordingly, for example, in the case where the discharge from the massage discharge port $a_1$-2 of the overhead shower $a_1$ on the branch line 7$a$ side and that from the spray discharge port $a_4$-1 of the body shower $a_4$ on the branch line 7$b$ side are simultaneously carried out, the flow rate adjusting valves 13$a$ and 13$b$ of both branch lines 7$a$ and 7$b$ are separately controlled by the flow rate adjusting mechanism 71 whereby discharges for preset values 17 l/min. and 20 l/min., set to both the discharge ports $a_1$-2 and $a_4$-1, are carried out therefrom. Discharges in the optimum discharge quantity are carried out from the shower discharge ports $a_1$-2 and $a_4$-1 which are different in function from each other.

In the case where the discharge quantities from both the discharge ports $a_1$-2 and $a_1$-1 are desired to be changed from the respective preset values according to the user's preference, the + and − buttons 61$a$ and 61$b$ are depressed to vary the set values of the discharge quantities with respect to both the discharge ports $a_1$-2 and $a_4$-1, whereby the discharge quantities from both the discharge ports $a_1$-2 and $a_4$-1 can be separately adjusted.

In the case where the setting of the discharge quantities with respect to the shower discharge ports $a_1$-1 to $a_6$-2 is changed from the present value set at the outset, the thus changes set value may be controlled so that it is reset after a predetermined time, for example, after three minutes and returned to the original preset value or the set value is reset when the power source is OFF and returned to the preset value at the time of next use. Furthermore, it is designed so that the preset value itself is not set but the set values of the discharge quantities with respect to each of, the shower discharge ports $a_1$-1 and $a_6$-2 set by the + and − buttons 61$a$, 61$b$ are effective till a next change of setting is performed.

In the shower apparatus A, according to the present embodiment constructed as described above, water is simultaneously discharged from the shower discharge ports $a_1$-1 to $a_6$-2, which are communicated with both the branch lines 7$a$ and 7$b$. The operation for adjusting the discharge quantities from these shower discharge ports to the optimum discharge quantity for every individual discharge port can be carried out easily and instantaneously by a push button operation from the operating panel $a_7$. Particularly, synergetic effect resulting from the simultaneous discharge of various kinds of showers $a_1$ to $a_6$ is great.

Combining and switching operations of discharges to be effected from the shower discharge ports $a_1$-1 and $a_6$-2 can be manually carried out from the operating panel $a_7$ by the user. However, in the present embodiment, several kinds of discharge programs are incorporated in advance into the control section 50 as will be described later and the automatic mode switches 67a, 67b and 67c on the operating panel a7 are selected for execution. Thereby, the discharges from the showers $a_1$ to $a_6$ are connected as intended, and effective shower bath can be easily enjoyed.

In case that a water discharging is carried out by changing over each of the shower discharging ports $a_1$-1 to $a_6$-2 by depressing automatic mode switches 67a, 67b and 67c in sequence, the amount of discharged water corresponding to each of the preset values is discharged from each of the shower discharging ports $a_1$-1 to $a_6$-2. However, the control section 50 may act in the same manner as described above even during an automatic operation mode, so that a discharge quantity from each of the shower discharging ports $a_1$-1 to $a_6$-2 performing the discharging operation is displayed at the discharge quantity displaying sections 62a and 62b. Depressing the + and − buttons 61a and 61b enables the discharge quantity from the shower discharging ports $a_1$-1 to $a_6$-2 performing the operation to be varied in the same manner as that of the manual operation.

Figure 4C:
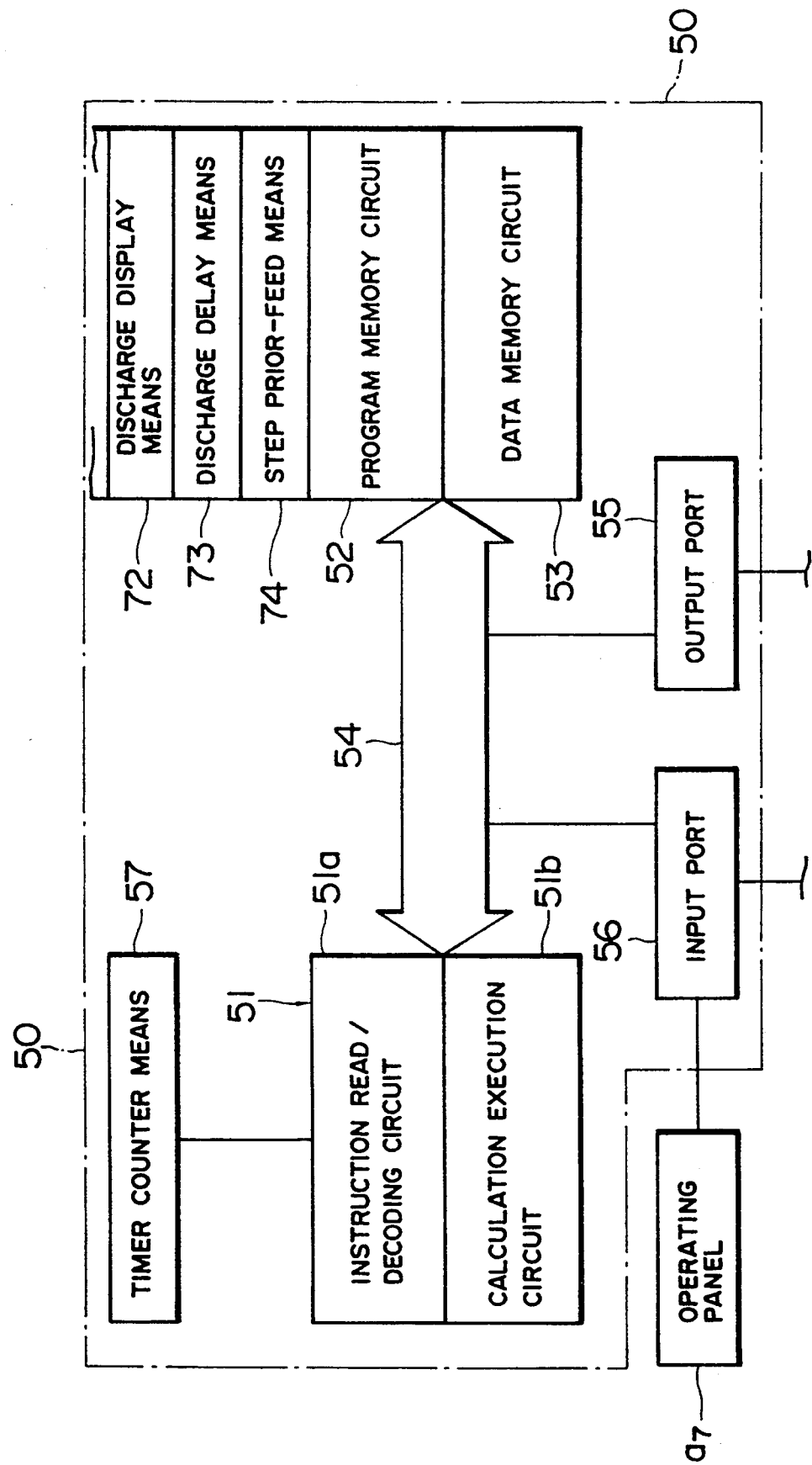

FIG. 4(C) is a block diagram showing another aspect of the control section 50, in which a discharge display device 72, a discharge delay device 73 and a step prior-feed device 74 are provided in parallel with a mechanism such as the water disposal control mechanism and the like. As will be apparent from FIG. 4(C), the control section 50 comprises the discharge display device 72 for successively displaying the program discharge content on the display section at every start of a step of the program. The discharge delay device 73 provides a predetermined discharge inhibition time t from the start of each step to the start of opening the electromagnetic valves 8a and 8b program-set in the step according to a signal input from the operating section 67 on the operating panel a7. The step prior-feed device 74 discontinues the step by which program is executed to stop the discharge, according to a signal input from the operating section 67 during the automatic control operation which includes the discharge inhibition time t and switching the step to next step to be shifted for the next discharge order.

A display section D is a light emitting body, for example, such as LED, which is electrically communicated with an operation signal converter 61 of the control section 50 disposed in front of the shower tower A' and at a position where a user can see it easily. The display section D comprises discharge position display lamps $D_1$ . . . provided corresponding to the discharge ports $a_1$-1 to $a_6$-2 in the schematic view of the whole shower tower A', shower-kind display lamps $D_2$ . . . provided corresponding to the shower discharge ports $a_1$-1 to $a_6$-2 on picture letters showing the kinds and function of showers, discharge-quantity display sections 62a, 62b showing instantaneous flow rate preset in program of discharges which can be adjusted by the adjusting buttons 61a, 61b, and a residual time display surface $D_3$ showing residual time until the termination of a program during the automatic control while subtracting as the program executes.

That is, the discharge display device 72 reads, every time when a signal is outputted from the operating section 67 to the control section 50 to start the step of program. The electromagnetic valves 8a and 8b are expected to be opened from the program in the step to light some of the discharge position display lamps $D_1$ and shower-kind display lamps $D_2$ corresponding to the shower discharge ports $a_1$-1–$a_6$-2. The discharge display device 12 reads the instantaneous discharge quantity to display it on the discharge quantity, display sections 62a and 62b, and reads the residual time until termination of the opening of the electromagnetic valves 8a and 8b in the last program to display it on the time display surface $D_3$, and reduces it by a predetermined unit after the passage of time.

The discharge delay device 73 starts, every time a signal is outputted from the operating section 67 to the control section 50 to start the programmed step. The discharge inhibition time t, for example, is about two seconds. The valves 8a and 8b are opened in this step. Upon termination of the discharge inhibition time t, the electromagnetic valves 8a and 8b are opened.

The step prior-feed mechanism 74 discontinues operation during the automatic control, more specifically, every time when a signal is outputted from the operating section 67 to the control section 50 during the discharge inhibition time t, which is the step in which the program is executed. As such the execution of the program with the electromagnetic valves 8a and 8b are forcibly switched to start the next step. In the case where a signal is outputted from the operating section 67 to the control 50 when the valves 8a and 8b are opened, after the passage of the discharge inhibition time t, the step presently executed is discontinued closing the electromagnetic valves 8a and 8b now opened. The execution of the program is forcibly switched to the next step to start the execution of the next step.

In the case of the present embodiment, three kinds of programs differ in the order of opening and closing operation. The opening time or the like of the electromagnetic valves 8a and 8b is stored in the program memory circuit 52. Automatic mode switches 67a, 67b and 67c and three selection display lamps $D_5$, which are close to the automatic mode switches 67a, 67b and 67c, are provided on the operating section 67 so that one of the mode switches 67a, 67b and 67c is selected and touched (depressed) whereby only the program corresponding thereto is read in the central processing unit 51. The step prior-feed mechanism 74 is actuated in response to the input signal only when one of the same automatic mode switches 67a, 67b and 67c as that selected previously, is again depressed during the automatic control operation. The step prior-feed mechanism is actuated in response to the input signal whereas one of the automatic mode switches 67a, 67b and 67c differs from that previously selected is depressed. The program now being executed is released and switched to the latter program.

In case of the present embodiment, an alarm sound generating section C, such as a buzzer, which is operatively connected to the discharge position display lamps $D_1$ . . . and shower-kind display lamps $D_2$ . . . of the display section D electrically communicated with the operation signal converter 6a of the control section 50, is disposed interiorly of the shower tower A'. When each step reaches a predetermined time for switching as the program executes, one or more discharge position display lamps $D_1$ and shower-kind display lamps $D_2$ are expected to discharge in the next step causing a flicker. At the same time, the alarm sound generating section C is actuated to transmit an alarm sound such as a buzzer for one second at 0.2 second intervals, for example.

Next the operation of the aforesaid discharge display mechanism 72, the discharge delay mechanism 73 and the step prior-feed mechanism 74 will be described hereinafter.

When one of the automatic mode switches 67a, 67b and 67c on the operating panel a7 is depressed, the selection display lamp $D_5$, on the display section D, close thereto, is lit. The first step of program corresponding thereto is started whereby the discharge position display lamp $D_1$ and shower-type display lamp $D_2$ on the display section D, corresponding to the electromagnetic valve I expected to be opened in the first step, are lit. The instantaneous discharge quantity is displayed on the discharge quantity display sections 62a and 62b, and the residual time until the termination of the step is displayed on the residual time display surface $D_3$. Simultaneously therewith, the discharge inhibition time t is started by the discharge delay means 73 and the valve 1 remains closed.

Figure 9A:
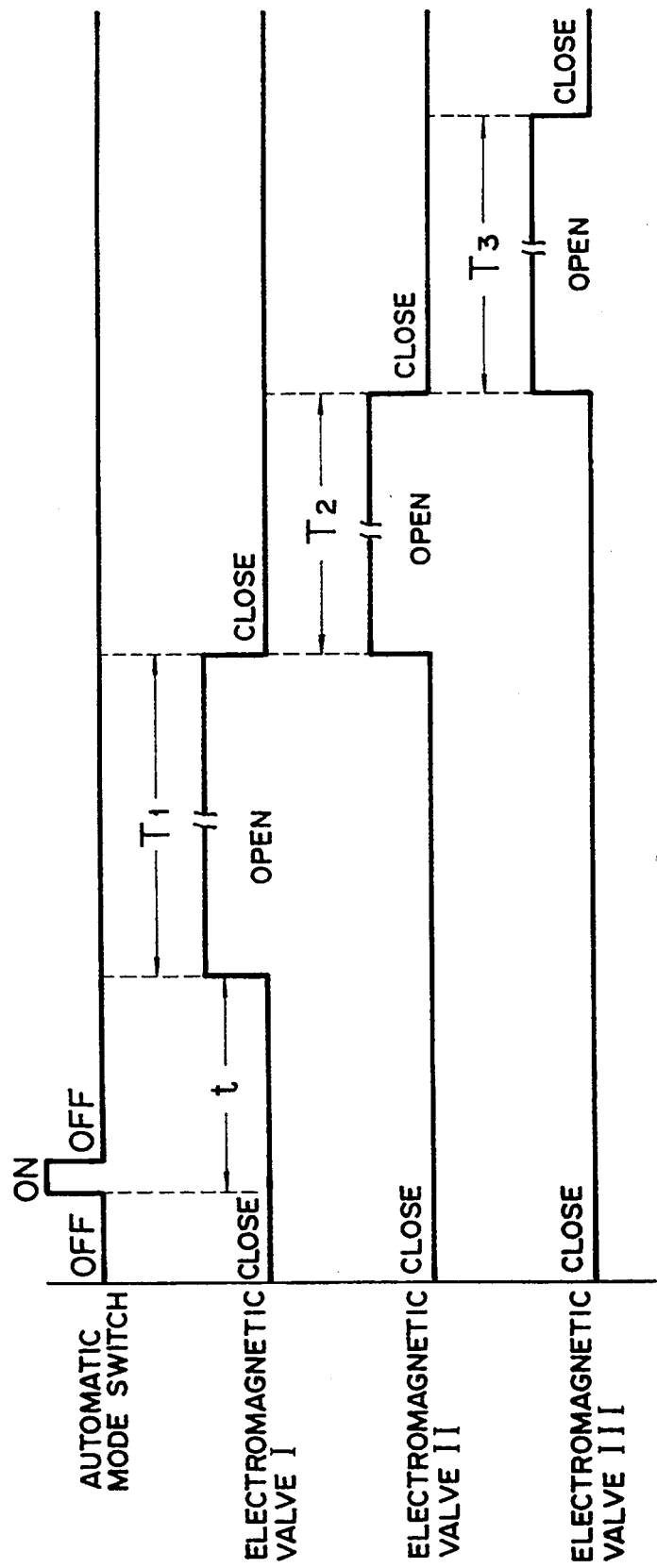
FIG. 9(A) is a time chart in case the step is not previously fed.

If in that state, the user does not depress any of the automatic mode switches 67a, 67b and 67c during the discharge inhibition time t, the electromagnetic valve I is opened in the first step after the passage of the discharge inhibition time (t), as shown in the time chart of FIG. 9a, so that hot water or cold water supplied from the hot and cold water mixing cock 3 is discharged from the programmed first shower discharge ports $a_1$-1 to $a_6$-2 in a small quantity at first and in a programmed instantaneous quantity after the passage of a predetermined time.

Before a predetermined time at which a preset valve-opening time $T_1$ is terminated from the start of the valve-opening, the discharge position display lamp D, and shower-kind display lamp $D_2$, corresponding to the electromagnetic valve II, are expected to be opened in the next step during the discharge at present flicker. At the same time, an alarm sound goes to notify the user of the next discharge, after which when the opening time $T_1$ has passed and the step is switched to the next step, the electromagnetic valve I is closed to stop the discharge. At the same time the flickering discharge position display lamp $D_1$ and shower-type display lamp $D_2$ are lit. Then, the electromagnetic valve II is opened to start the discharge. Further, the display of the discharge quantity display sections 62a and 62b is switched and the display of the residual time display surface $D_1$ is also reduced as the time passes.

After the passage of the opening time $T_2$ to the electromagnetic valve II as described above, the step is switched to the final step, and the electromagnetic valve II is closed and at the same-time the electromagnetic valve III is opened. After the passage of the opening time T, the program is terminated and the display on the residual time display surface $D_3$ is 0.

After the passage of $t_1$, but before the discharge inhibition time t in the first step passes, the user looks at the lit discharge position display lamp $D_1$ and the shower-type display lamp $D_2$ and again depresses the automatic mode switches 67a, 67b and 67c for the lit display lamp $D_5$ selected according to the physical condition and the individual preference. Then the step is switched to the next step with water not discharged at the time before the electromagnetic valve I is opened, as shown in the time chart of FIG. 9B, by the step prior-feed mechanism 74, and executed. With this, the discharge position display lamp $D_1$ and shower-kind display lamp $D_2$ corresponding to the electromagnetic valve II, expected to be opened in the next step, are lit. The display of the discharge quantity display sections 62a, 62b and the residual time display surface $D_4$ are switched and at the same time the discharge inhibition time t newly starts.

If the same automatic mode switches 67a, 67b and 67c are again likewise operated after the elapsing of $t_2$ of the discharge inhibition time t, the step is switched to the next step at the same time before the electromagnetic valve II is opened as described above. The display section D corresponding to the electromagnetic valve III is switched. At the same time, the discharge inhibition time t starts, and if it is not again operated until the discharge inhibition time t has passed, the electromagnetic valve III is opened to start discharge. After the passage of the opening time $T_3$, the program is terminated.

Accordingly, if the operation is repeated during the discharge inhibition time t, the whole programmed discharge content is displayed without water being discharged.

Furthermore, in the state where the electromagnetic valve II is opened as shown in the time chart of FIG. 9(C), for example, similar operation is made at the time before the opening time $T_2$ has passed. Then, the electromagnetic valve II is closed at the time so that the discharge is stopped and at the same time the charge inhibition time t starts. In the state where the electromagnetic valve III is opened, similar operation is made at the time before the opening time $T_3$ has passed. Then, the valve III is closed to terminate the program. Accordingly, the program is terminated soon every operation of the same automatic mode switches 67a, 67b and 67c, and the residual time displayed on the residual time display surface $D_3$ becomes short.

The aforesaid pattern of the discharged water under an operation of each of the automatic mode switches 67a, 67b and 67c is not limited to the above, but the shower type, a water discharging time and a water discharging time can be freely combined.

While in the previously illustrated embodiment, a plurality of shower discharge ports $a_1$-1 to $a_6$-2 which are different in function, are provided on the shower tower A' to automatically successively discharge hot water or cold water in response to the program, it is to be noted that the same is true for the case where hot water or cold water is successively automatically discharged out of the shower discharge ports having the same function and different position.

Moreover, the discharge content displayed on the display section D is not limited to that as described above but suitable contents may be displayed thereon. Furthermore, the alarm sound generating section C may not be provided.

According to the above-described embodiment, a signal is outputted from the operating section 67 to the control section 50 to execute the program whereby at the start of each step, the discharge display mechanism 72 displays the discharge content of that step on the display section D and the discharge delay mechanism 73 starts the discharge inhibition time t. Every time the signal is again inputted from the operating section 67 during the discharge inhibition time t, the step prior-feed device 74 switches to the next step. The discharge content of the next step is displayed on the display section D to newly start the discharge inhibition time t. The electromagnetic valves 8a and 8b, set in the step during the execution of the program, are opened only at the time when a signal is not inputted from the operating section 67 during the discharge inhibition time t.

Therefore, the discharge content set in the program during the automatic control can be converted.

Accordingly, as compared with the prior art in which the discharge contents such as the discharge order are fixed every present program, the discharge order, the discharge time and the like can be suitably changed according to the user's physical condition, the individual taste or the like. The user's free operation can be made and the apparatus is easily used. Selection of programs, operation and the like are simpler than for apparatus in which various programs are stored in a controller, rendering operation easy.

Furthermore, if steps are previously fed plural times by the operating section 67 during the discharge inhibition time t whereby a plurality of discharge contents differing in discharge position, discharge time and the like are displayed at the start of each step, the whole programmed discharge content is seen without being discharged. Therefore, the whole programmed discharge content can be displayed in a small exclusive area.

Figure 4D:
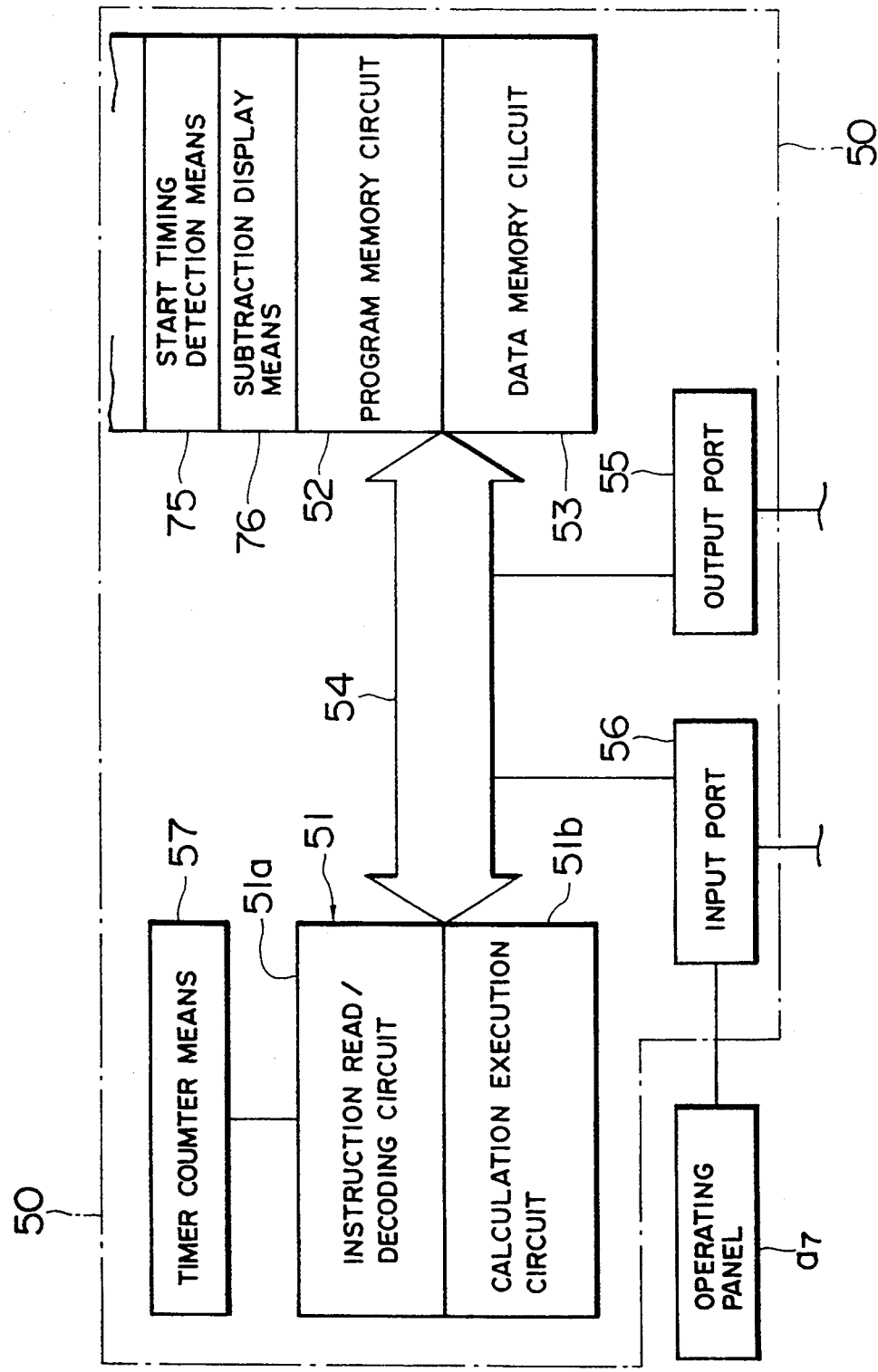

FIG. 4(D) is a block diagram showing another aspect of the control section 50. As start timing detection device 75 and a subtraction display device 76 are provided in parallel with other devices such as the water disposal control device 58, 59, 60, etc.

As will be apparent from FIG. 4D, the control section 50 comprises the start timing detection device 75 for detecting the time at which automatic control is started by a signal from the operating section 67. The subtraction display device 76 displays the display time of the programmed automatic control on the basis of the detection signal outputted from the start timing detection device 75 on the residual time display surface $D_3$ disposed at a position easily seen by the user of the shower tower body A', to subtract the display time as the display time passes every unit.

That is, the start timing detection device 75, when an automatic control start signal is outputted from the operating section 67 to the controller 50, detecting the time at which the first programmed electromagnetic valves $8a$ and $8b$ are opened, outputs a detection signal to the subtraction display device 76. When inputting the detection signal, the subtraction display device 76 first reads the opening time from the start of the opening of the first programmed electromagnetic valves $8a$ and $8b$ to closing of the final programmed valves $8a$ and $8b$, to total the time, which is displayed in numeral form on the remaining time display surface $D_3$. At the same time, the timer counter device 57 is operated so that displayed time $d_1$, for example, in units of seconds, is subtracted in synchronism with the count of the timer counter device 57, and at the closing of the programmed final electromagnetic valves $8a$ and $8b$, displayed time $d_3$ is 0.

Next, the operation of the aforesaid start timing detection device 75 and subtraction device 76 will be described.

When any one of the automatic mode switches $67a$, $67b$ and $67c$ on the operating panel $a_7$ is depressed, the electromagnetic valves $8a$ and $8b$ are successively opened in response to the program corresponding thereto so that hot water or cold water supplied from the hot and cold water mixing cock 3 commences discharge in a programmed instantaneous quantity from the programmed first shower discharge ports $a_1$-1 to $a_6$-2. At the same time, the start timing detection device 75 detects an automatic control start signal to output a detection signal to the subtraction display device 76. With this, the subtraction display device 76 displays the residual time $d_1$ until the program is terminated on the residual time display surface $D_3$ and subtracts the residual time $d_3$ by a predetermined unit with the passage of the discharge time. At the time of termination of discharge from the programmed final shower discharge ports $a_1$-1 to $a_6$-2 the residual time $d_3$ is 0. Accordingly, the user can see the residual time $d_3$ to finish washing his or her body or head until termination of the discharge.

While in the above-illustrated embodiment, a plurality of shower discharge ports $a_1$-1 to $a_6$-2, differing in function, are provided on the shower tower body A' and programmed hot water or cold water are successively automatically discharged by the operation of the operating section 67, it is to be noted that the same is true for the case where the automatic control is started by those other than the operating section 67, and in the case where shower discharge ports having the same function and different in position of arrangement are successively automatically discharged.

Furthermore, while in the above-described embodiment, the residual time $d_3$ until one program is terminated is displayed on the residual time display surface $D_3$, it is to be noted that, for example, residual time of the electromagnetic valves $8a$ and $8b$, which are successively opened and closed according to the programs, may be displayed one by one. It is contemplated that the residual time $d_3$ until one program is terminated is displayed together therewith.

According to the above-described embodiment, the start timing detection device 75 detects an automatic-control start time of the control section to output a detection signal whereby the subtraction display means 76 displays the discharge time of the programmed automatic control on the residual time display surface $D_3$. The display is reduced by a predetermined unit as the residual time $d_3$ passes, and the display is 0 at the time of termination of the automatic control. Therefore, the user can be notified of the discharge residual time $d_3$ during the automatic control discharge.

Accordingly, as compared with the prior art which is not provided with means for notifying the user of the residual time $d_3$ until the discharge is terminated, during the automatic control discharge, the user can see the display of the discharge to find the residual time $d_3$ during the present discharge to finish washing his or her body or head before the discharge is terminated. It is not necessary to re-operate the system to render the use thereof easy.

Figure 4E:
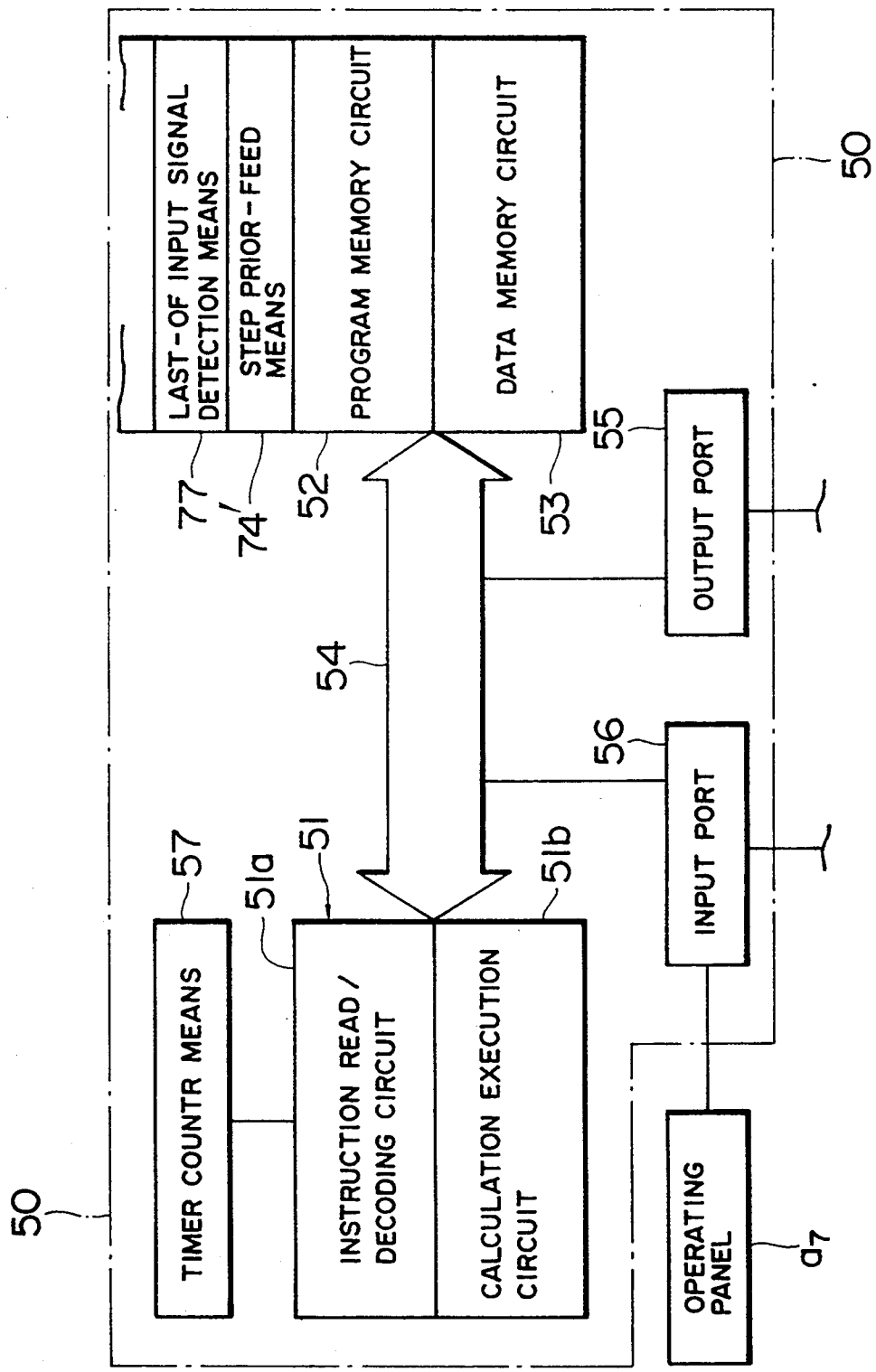
Figure 4F:
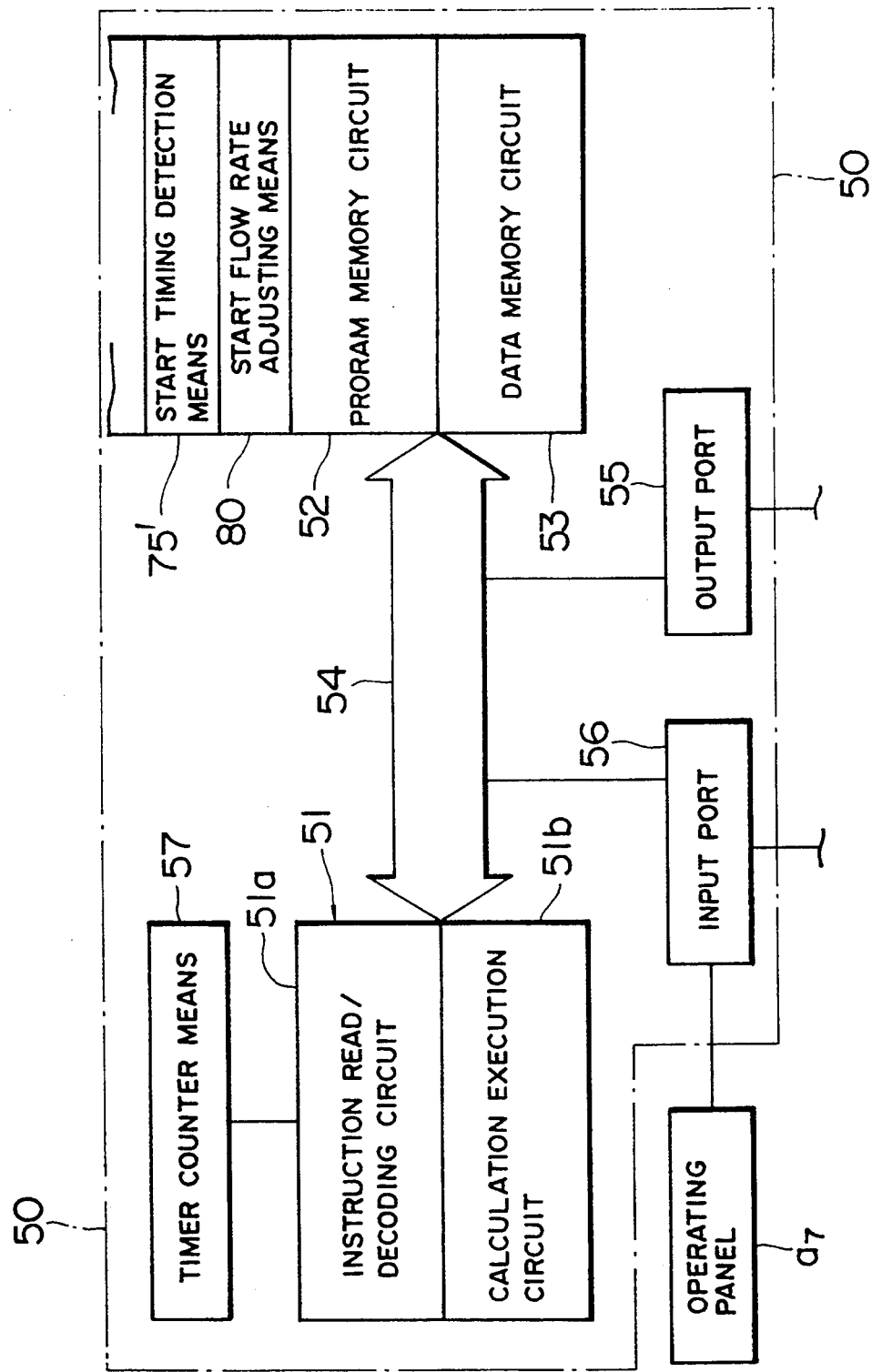

FIG. 4(E) is a block diagram showing another aspect of the control section 50. A last-off input signal detection device 77 and a step prior-feed device 78 are shown provided in a part of the memory circuit. As described above, the control section 50 comprises the last-off input signal detection device 77 for detecting a signal input from the operating section 67 during the time the electromagnetic valves $8a$ and $8b$ are successively opened and closed with the execution of the steps of the programs. The step prior-feed device 78 is provided for discontinuing the step of the programs now being executed on the basis of the detection signal outputted from the last-off input signal detection device 77 stopping discharge and switching the step to the next step of the next discharge order.

Any one of the automatic mode switches $67a$, $67b$ and $67c$ on the operating panel $a_7$ is selected and depressed in the operating panel, only the program according thereto is read into the central processing unit 51, and only when the same automatic mode switches 67a, 67b and 67c as those selected previously are again depressed during the automatic control operation. The last-off input signal detection device 77 detects an input signal. In the case where the automatic mode switches 67a, 67b and 67c, differing from that previously selected, is depressed, the program now being executed is released switching the program into the latter program.

That is, when the last-off input signal detection device 77 stores therein a signal inputted from any one of the automatic mode switches 67a, 67b and 67c on the operating panel a7 in the initial state, it detects that the same signal, as the stored input signal, is inputted from the automatic mode switches 67a, 67b and 67c during the automatic control discharge started. A detection signal is outputted to the step prior-feed device 74'. When the detection signal is inputted, the step prior-feed device 74' first discontinues the step now being executed to close the opened electromagnetic valves 8a and 8b. This stops discharge and forcibly switches the execution of the step to the next step whereby the electromagnetic valves 8a and 8b, set in program to the next step, are opened to start discharge. Thereafter, the automatic control discharge is successively accomplished according to the programs.

The operation of the shower apparatus will be described hereinafter.

If any one of the automatic mode switches 67a, 67b and 67c on the operating panel a7 is selected and depressed, the selected display lamp $D_5$ of the display section D closest thereto is lit. The electromagnetic valve I, set to the first step of the program corresponding thereto, is opened so that hot or cold water supplied from the hot and cold water commences discharge from the programmed first shower discharge ports $a_1$-1 to $a_6$-2 in a small quantity at first and in a programmed instantaneous quantity after passage of a predetermined time. At the same time the discharge position display lamp $D_1$ and shower-type display lamp $D_2$ of the display section D are lit corresponding to the aforesaid discharge. The residual time until the program is terminated is displayed on the residual time display surface $D_3$ and the instantaneous flow rate not being discharged is displayed on the discharge quantity display sections 62a and 62b.

Thereafter, before a predetermined time at which the step is switched from the initial step to the next step, the discharge position display lamp $D_1$ and shower-kind display lamp $D_2$, corresponding to the shower discharge ports $a_1$-1 to $a_6$-2 that are expected to be discharged in the next step being now discharged, flicker and at the same time, an alarm sound gives a user notice of the next discharge.

Figure 10A:
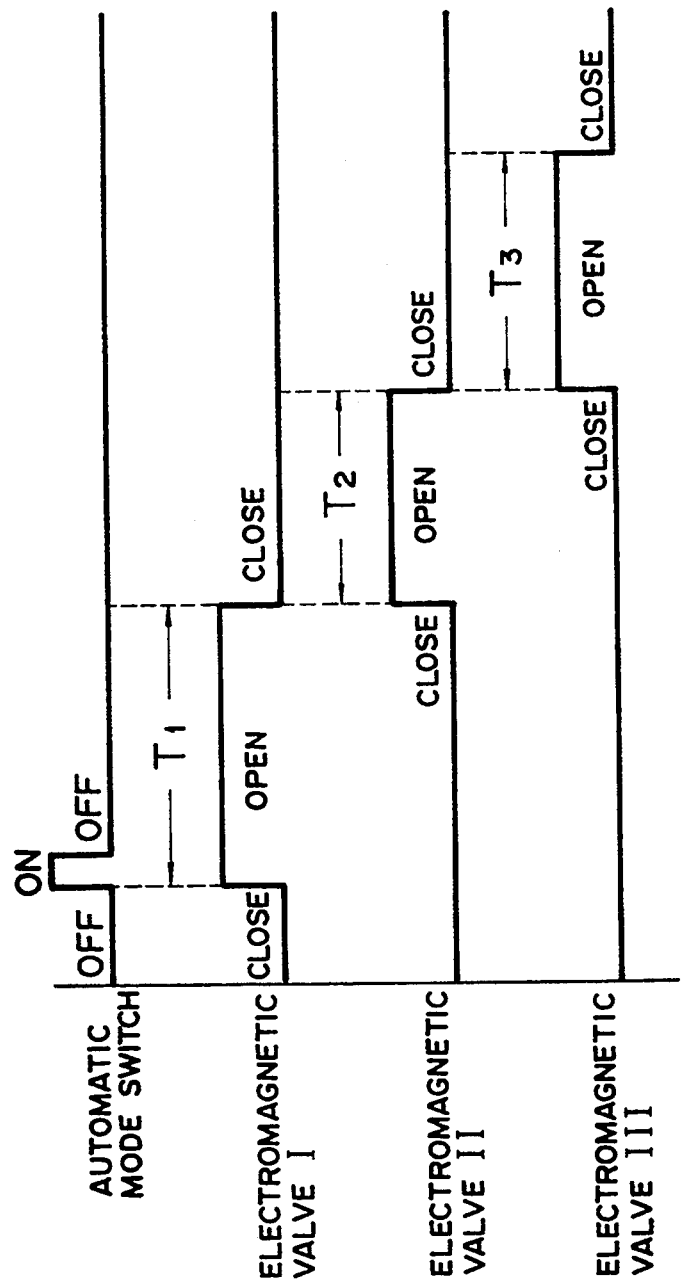
FIG. 10 (A) is a time chart in case the step is not previously fed.
FIG. 10(B) is a time chart in case the step is previously fed.

In that state, if the user does not depress any of the automatic mode switches 67a, 67b and 67c, the electromagnetic valve I, in the first step, remains open until a predetermined opening time $T_1$ is terminated, according to the program as shown in the time chart of FIG. 10A. At the same time the valve I is closed, the electromagnetic valve II in the next step opens. After passage of the opening time $T_2$, the electromagnetic valve III in the final step opens, and after the passage of the opening time $T_3$, the program is terminated.

When any one of the automatic mode switches 67a, 67b and 67c for which the selected display lamp $D_5$ is lit, according to the user's physical condition or individual taste, is again depressed during the time the user sees a notice of the next discharge or during the time before the user sees a notice of the next discharge, the valve is closed before the opening time $T_1$ of the electromagnetic valve I is terminated as shown in the time chart of FIG. 10(B) by the last-off signal detection device 17 and the step prior-feed device 74' thus stopping discharge. The electromagnetic valve II in the next step is opened to start discharge.

Thereafter, when automatic mode switches 67a, 67b and 67c are depressed again before the opening time $T_2$ of the electromagnetic valve II is terminated, the valve II is closed at that time whereas the valve III is opened. When a similar operation is made before the opening time $T_1$ of the electromagnetic valve III is terminated, the electromagnetic valve III is closed to terminate the program.

Whenever the same automatic mode switches 67a, 67b and 67c are operated, the termination of program is quickened, and the residual time displayed on the residual time display surface $D_3$ is shortened.

According to the embodiment as described above, the last-off input signal detection means 77 detects an input signal from the operating section to output the detection signal while the electromagnetic valves 8a and 8b are successively opened and closed on the basis of the steps of the programs. The step prior-feed means 74' discontinues the step of the program now being executed. The step is switched to the next step for the next discharge order so that the termination of the program is quickened, and therefore, the discharge order and the discharge time can be changed during the automatic control discharge.

FIG. 4(F) is a block diagram showing another aspect of the control section 50. A start timing detection device 75' and a start flow rate adjusting device 80 are shown provided in a part of the memory circuit.

As described above, the control section 50 comprises the start timing detection device 75' for detecting the time at which the automatic control is started by a signal from the operating section 67 of the operating panel a7. The start flow rate adjusting device 80 is provided for throttling an opening degree of the flow rate adjusting valves 13a and 13b, positioned upstream of the programmed first shower discharge ports $a_1$-1 to $a_6$-2, according to the detection signal outputted from the start timing detection device 75', and for loosening the opening degree of the flow rate adjusting valves 13a and 13b after a predetermined time to provide a programmed opening degree.

That is, when the automatic control start signal is outputted from the operating section 67 to the control section 50, the start timing detection device 75' outputs a detection signal to the start flow rate adjusting device 80. When the detection signal is inputted, the start flow rate adjusting device 80 first causes the timer counter device to throttle the opening degree of the flow rate adjusting valves 13a and 13b upstream of the programmed first discharge ports $a_1$-1 to $a_6$-2. Substantially simultaneously therewith, the valves 8a and 8b, in communication with the programmed first shower discharge ports $a_1$-1 to $a_6$-2, are opened to discharge hot water or cold water to an extent that the hot water or cold water are exposed to the body of the user violently.

Figure 11A:
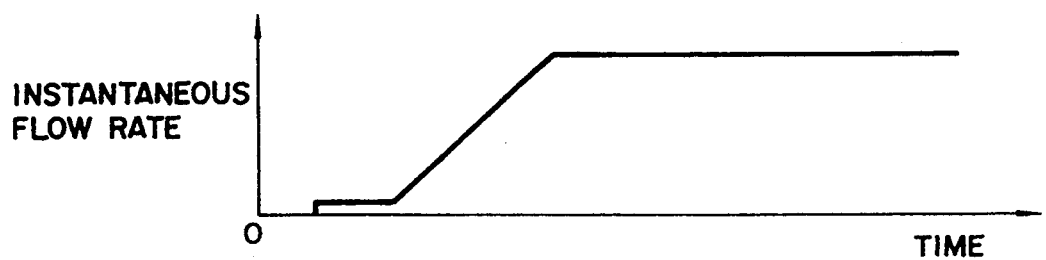
FIG. 11(A) is a graph showing the relationship between the instantaneous flow rate of hot water or cold water discharged out of initial shower discharge ports set in program and time.
Figure 11B:
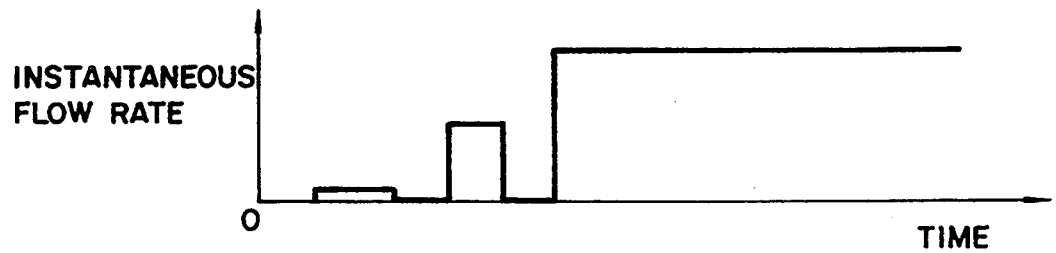
FIG. 11(B) and FIG. 11(C) are graphs showing other examples.
Figure 11C:
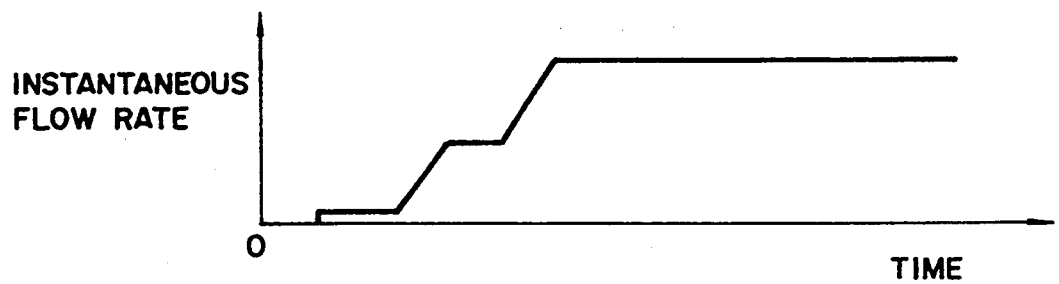

Thereafter, when the timer counter device 57 counts a predetermined time from the start of discharge, the start flow rate adjusting device 80 gradually loosens the opening degree of the flow rate adjusting valves 13a and 13b as shown in FIG. 11(A), for example, to gradually increase the instantaneous flow rate of hot water or cold water discharged. When the opening degree of the valves 13a and 13b assumes the programmed opening degree, and the instantaneous flow rate assumes a set flow rate, the opening degree of the flow rate adjusting valves 13a and 13b is maintained, or the programmed first electromagnetic valves 8a and 8b are intermittently opened and closed while loosening the opening degree of the flow rate adjusting electromagnetic valves 8a and 8b as shown in FIG. 11(B). This stepwisely increases the instantaneous flow rate of the hot water or cold water except for the discharge stop time, or the opening degree of the flow rate adjusting valves 13a and 13b is intermittently loosened as shown in FIG. 11(C) so as to stepwisely increase the instantaneous flow rate.

The operation of the shower apparatus as described above will be described hereinafter.

When any one of the automatic mode switches 67a, 67b and 67c on the operating panel $a_7$ is depressed, the electromagnetic valves 8a and 8b are successively opened on the basis of the program corresponding thereto. The start timing detection device 75' first detects an automatic control start signal to output a detection signal to the start flow rate adjusting device 80. With this, the start flow rate adjusting device 80 throttles an opening degree of the flow rate adjusting valves 13a and 13b to discharge hot water or cold water supplied from the hot and cold water mixing cock 3 to an extent that the hot water or cold water is not violently exposed to the user from the programmed first shower discharge ports $a_1$-1 to $a_6$-2. After a predetermined time, the start flow rate adjusting device 80 loosens an opening degree of the flow rate adjusting valves 13a and 13b to thereby increase the instantaneous flow rate of hot water or cold water discharged to assume a programmed instantaneous flow rate.

According to the above-described embodiment, the start timing detection device 50 detects automatic control start timing of the control section 50 to output a detection signal whereby the start flow rate adjusting device 80 changes an opening degree of the flow rate adjusting valves 13a and 13b. Accordingly, hot water or cold water is discharged for a predetermined time in a less instantaneous flow rate from the programmed first shower discharge ports $a_1$ to $a_6$ and thereafter the instantaneous flow rate is increased closer to a programmed set flow rate to preventing a rapid discharge at the time of starting automatic control. Thereby, the user is relieved from a surprise and can use automatic control with ease.

The adjustment of flow rate at the start of discharge is effective in the case where the undershower $a_6$ in which shower water is discharged upwardly, as described later. The operation will be described hereinafter.

When the switch $b_6$-3 of the operation switches $b_1$-1 to $b_1$-3 of the undershower $a_6$ at the operating panel $a_7$ is depressed, the discharged water from both the right and left discharge ports $a_6$-2 and $a_6$-2 is gradually increased as described above and reaches the predetermined amount of discharge. Under this condition, the water stop switch 64 is depressed or "both" switch ($b_6$-3) is depressed again, thereby both electromagnetic valves 8a and 8b are closed causing the discharged water from both discharging ports $a_1$-1 and $a_6$-2 to be stopped.

The water stopping switch 64 is not depressed and one of the "left" and "right" switches $b_6$-1 and $b_6$-2 is depressed, for example, "left" switch $b_6$-2 is depressed, the flow rate adjusting valve 13b is metered and when the amount meters to ½ of the predetermined flow rate, resulting in that the right electromagnetic valve 8b is closed and the discharged water from the right discharging port $a_6$-1 is stopped and subsequently the flow rate adjusting valve 13b is loosed, the instantaneous flow rate to be discharged from the left discharging port $a_6$-2 approaches the predetermined flow rate value. When the flow rate reaches the predetermined value, the operation of the flow rate adjusting valve 13b is stopped, and the flow rate subsequent to this operation is kept constant.

Under an initial condition, any one of the "left" and "right" switches $b_6$-1 and $b_6$-2 of the undershower $a_6$ is selected, for example, "right" switch $b_6$-1 is depressed, thereby the flow rate adjusting valve 13b is metered and at the same time the electromagnetic valves 8a and 8b are opened and then an instantaneous flow rate from the right and left discharging ports $a_6$-1 and $a_6$-2 is less in volume or a degree not striking against the body too much, the water discharging is started and after a predetermined time elapses, only the left electromagnetic valve 8b is closed after a predetermined time. Subsequently, the flow rate adjusting valve 13b is loosed and an instantaneous flow rate discharged from the right discharging port $a_6$-1 approaches the predetermined flow rate. When the value reaches the set flow rate, the operation of the flow rate adjusting valve 13b is stopped.

Under this condition, the water stopping switch 64 is depressed or the "right" switch $a_6$-1 is depressed again, thereby the right electromagnetic valve 8b is closed to cause the discharged water from the right discharging port $a_1$-1 to be stopped.

"Left" switch $b_6$-2 for the undershower is depressed without depressing the water stopping switch 64 causing the right electromagnetic valve 8b to be closed. The discharged water from the right discharging port $a_6$-1 is stopped. At the same time, the left electromagnetic valve 8b is opened and the water discharging from the left water discharging port $a_6$-2 is started.

In addition, the "both" switch $b_1$-3 of the undershower 9b is depressed from this state to cause both electromagnetic valves 8a and 8b to open and simultaneously with this operation, the flow rate adjusting valve 13b is metered. Then, the water discharging operation is started in such a degree as the hot water or cold water from the right and left water discharging ports $a_6$-1 and $a_6$-2 may not strike severely against the user's body, and subsequently the flow rate adjusting valve 13 is loosed and the instantaneous flow rate of the water discharged from both discharging ports $a_6$-1 and $a_6$-2 approaches the predetermined flow rate. When it reaches the predetermined flow rate, the operation of the flow rate adjusting valve 13b is stopped.

When any one of the switches $b_1$-1 to $b_1$-3 for the undershower on the operating panel $a_6$ is depressed, the electromagnetic valves 8a and 8b or one valve 8b corresponding thereto is opened. At the same time, the start timing detection means 79 first detects an automatic control start signal to output a detection signal to the start flow rate adjusting device 80. With this, the start flow rate adjusting device 80 throttles an opening degree of the flow rate adjusting valve 13b, whereby hot water or cold water supplied from the hot and cold water mixing cock 3 is supplied to discharge ports $a_6$-1 to $a_6$-2 of the undershower. The discharge is started to an extent that hot water or cold water is not exposed violently to the body of the user from discharge ports $a_6\text{-}1$ and $a_6\text{-}2$.

The start flow rate adjusting device 80 loosens an opening degree of the flow rate adjusting valve $13b$ simultaneously, or after a predetermined time to thereby increase an instantaneous flow rate of hot water or cold water to be discharged to assume a programmed instantaneous flow rate so that the hot water or cold water is discharged obliquely and upwardly towards the lower half of the body of the user who stands up in front of the shower tower body $A'$ from the discharge ports $a_6\text{-}1$, $a_6\text{-}2$.

The upward discharge is exposed to the front of the waist of the user when the user stands up frontwardly opposite to the shower tower body $A'$, exposed to the back of the waist and the hips when the user stands up backwardly, and exposed to a thigh and the calf when the user moves toward the shower tower body $A'$.

Figure 12:
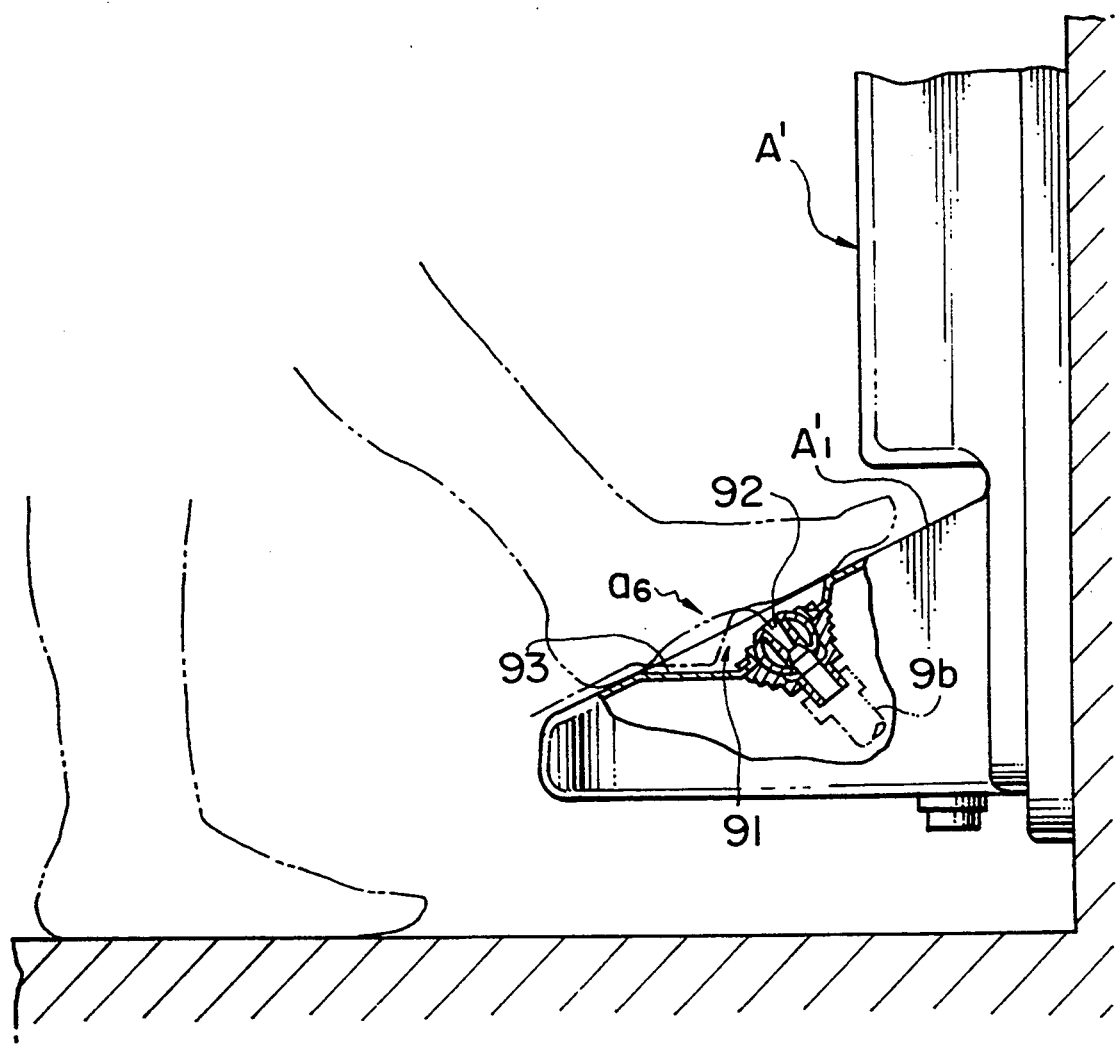
FIG. 12 is a partly cutaway side view showing an under shower portion in an enlarged scale.
Figure 13:
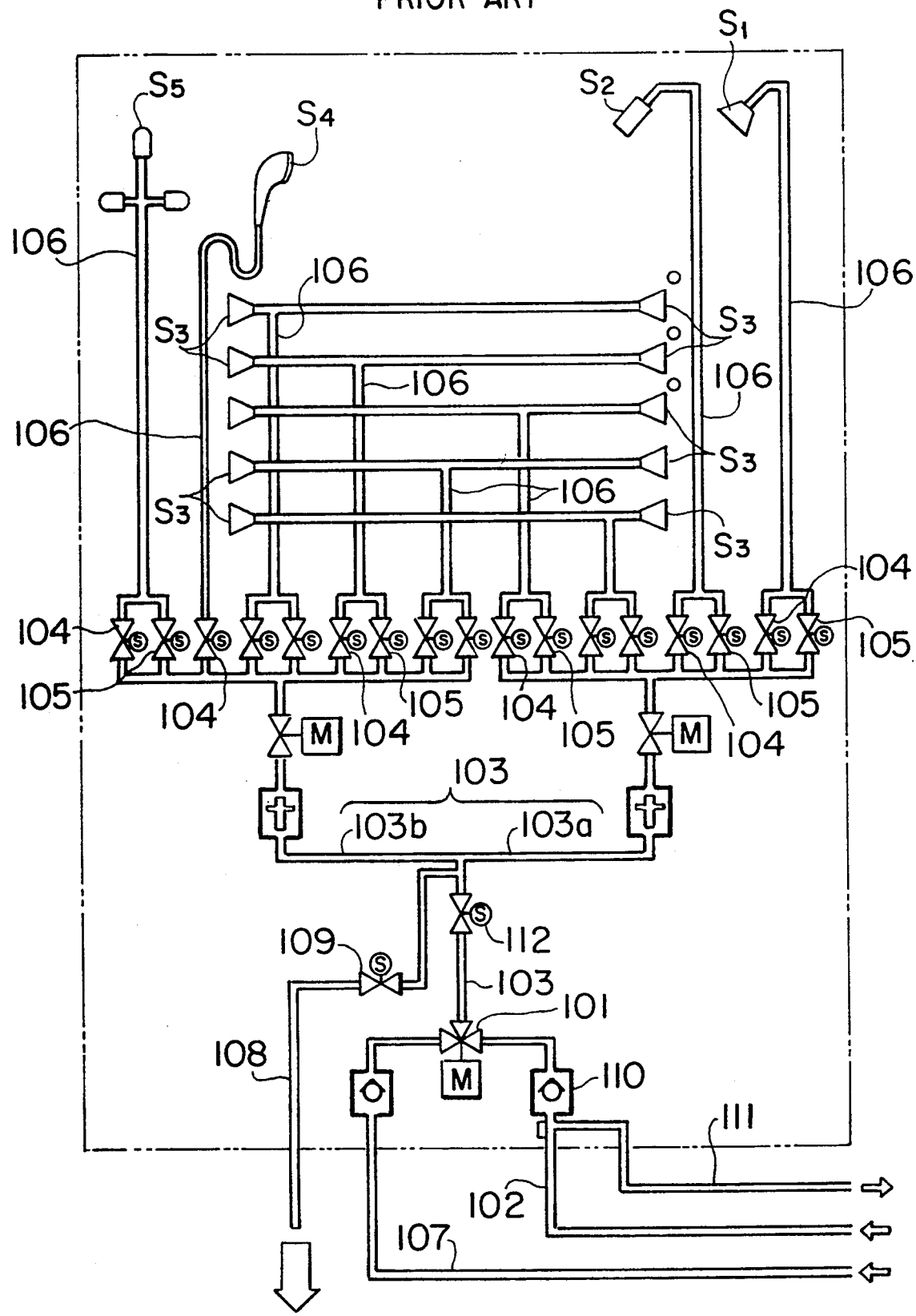
FIG. 13 is a schematic view showing a conventional shower apparatus.

As shown in FIG. 12, when the user stands up and extends his or her foot to be placed on the recess 91 to which hot water or cold water is discharged on the upper surface of the extended portion $A'_1$, the hot or cold water is exposed to the sole. When the user sits on the chair and places both feet on recesses 91 in the state where hot water or cold water is discharged from both discharge ports $a_6\text{-}1$, $a_6\text{-}2$, the hot water or cold water is exposed to the soles of both feet.

Furthermore, when the stop switch 64 on the operating panel $a_7$ is depressed or any one of the switches $b_6\text{-}1$ and $b_6\text{-}3$ for the undershower is again depressed, the valve $8b$ presently open is immediately closed to stop discharge from the discharge port 5 $a_6\text{-}1$, $a_6\text{-}2$.

In the case where the control, as described above, is applied to the undershower $a_6$, stimulation can be given to portions of the lower half of the body and soles to which enough stimulation cannot be given by the body shower $a_4$, the overhead shower $a_1$ or the hand shower $a_5$ and these body parts can be massaged. Also, at the start of discharge, the user is relieved from a surprise, and less-familiar undershower $a_6$ can be used in comfort.

In the case where other showers are provided together with the undershower $a_6$, and the start and stop of discharge from these showers are controlled by the operating panel $a_7$, a small amount of discharge at the start of discharge of the undershower $a_6$ can be used as a function of a notice. If the undershower $a_6$ is erroneously discharged, instead of using other showers, it can be stopped promptly by the aforesaid function of a notice.

Next, the characteristic exposing hot water $a_3$ in the shower discharge ports $a_1\text{-}1$ to $a_6\text{-}2$ and the construction of the undershower $a_6$ in the shower apparatus A according to the present embodiment will be described hereinafter.

As shown in FIG. 2, a pair of left and right discharge ports $a_3\text{-}1$ and $a_3\text{-}2$, for exposing hot water $a_3$, are obliquely upwardly protruded on both sides 12 at the upper part of the longitudinally extending shower tower body $A'$. Such ports are designed so that hot water or cold water from the discharge ports $a_3\text{-}1$ and $a_3\text{-}2$ are discharged in a parabola-like fashion. The hot water or cold water is intermittently exposed to two parts such as both shoulders of the user who sits on the chair in front of the shower tower body $A'$. A pair of left and right discharge ports $a_6\text{-}1$ and $a_6\text{-}2$ of the undershower $a_6$ are obliquely upwardly disposed on the upper surface of the extended portion $A'_1$ which protrudes to the lower end of the shower tower body $A'$ so that hot water or cold water is discharged from the discharge ports $a_6\text{-}1$ and $a_6\text{-}2$ of the undershower toward the lower half of the body of the user who stands up in front of the shower tower body $A'$.

As shown in FIG. 12, the upper surface of the extended portion $A'_1$ is inclined upward from the extreme end toward the shower tower body $A'$. A pair of recesses 91, which are smaller than long-side dimension of the sole and smaller than short-side dimension thereof, are formed in the central portion. Discharge ports $a_6\text{-}1$ and $a_6\text{-}2$ of the undershower are bored in the bottom surface of the recesses 91, whereby even if the sole of a foot is placed so as to cover the recess 91, the discharge ports $a_6\text{-}1$ and $a_6\text{-}2$ of the undershower are not blocked. Each recess 91 is formed with a drain passage 93 with its lower inner peripheral surface partly inclined substantially horizontally or downwardly so as to discharge hot water or cold water from the inside of the recess 91 to the outside.

The drain passage 93 is not limited to that as described above but for example, a through-hole extending through the inside and outside of the recess 91 may be employed. The inside diameter of each discharge port $a_6\text{-}1$ and $a_6\text{-}2$ of the undershower can be partly drawn from the inside diameter of the hot water line $9b$ to increase the flow velocity of hot water or cold water supplied from the hot and cold water mixing cock 3 for discharge.

Next, the operation will be described.

First, the discharge switches $b_3\text{-}1$ and $b_3\text{-}2$ for exposing hot water $a_3$ on the operating panel $a_7$ are depressed, to alternately open the electromagnetic valves $8a$ and $8b$ for a period of time, or only one valve $8a$ is opened, or both the valves $8a$ and $8b$ are simultaneously opened. Then, hot water or cold water in a set instantaneous flow rate and at a set temperature is supplied from the hot and cold water mixing cock 3 to each of the discharge ports $a_3\text{-}1$ and $a_3\text{-}2$ for exposing hot water $a_3$.

The hot water or cold water are obliquely upwardly discharged from each of the discharge ports $a_3\text{-}1$ and $a_3\text{-}2$ for exposing hot water $a_3$. The discharge hot water or cold water depicts a parabola, in which case at the apex thereof, upward velocity component is lost and a state close to a free drop is provided. A stream line is divided into water droplets, which are accelerated by gravity. As a result, at drop points where hot water or the like contacts the shoulders of the user or the like, an intermittent discharge state is obtained. Thus, the hot water or the like alternately contacts two parts such as both shoulders or concentratedly contacts one part such as one shoulder or simultaneously contacts two parts such as both shoulders.

Operation of the undershower $a_6$ is performed as described above.

According to the above-described embodiment, hot or cold water intermittently falls from the exposing hot water $a_3$, at the upper part of the shower tower body $A'$, to intermittently expose it to the body, or hot water or cold water is blown upwardly from the lower under shower $a_6$ to expose it to the lower half of the body and the sole of foot. Therefore, exposing hot water, which is excellent in stimulation and massage feeling, can be discharged from the top of the shower tower body $A'$, or suitable stimulation can be given from the bottom of the shower tower body $A'$ to the waist, the hips, the thigh, the calf, the sole and the like.

Moreover, the electromagnetic valves 8a, 8b are alternately controlled to intermittently discharge hot water or cold water for a preset period of time from each of the discharge ports a₃-1 and a₃-2 of the exposing hot water a₃ or only one electromagnetic valve is controlled to concentratedly intermittently discharge hot water or cold water from a single discharge port or both electromagnetic valves 8a and 8b are simultaneously controlled to simultaneously intermittently discharge the exposing hot water a₃ or the like from a plurality of discharge ports whereby exposing hot water, which is excellent in stimulation and massage feeling, can be discharged according to the purpose of the user.

As compared with the conventional apparatus in which hot water or cold water is fallen in a rod-like fashion to expose hot water or cold water to the body, the massage effect is enhanced. In addition, as compared with the prior art, which has a single discharge port, the apparatus of the invention can be freely used according to the purpose of the user to render easy use of the apparatus.

We claim:

1. A shower apparatus comprising:
    a first hot water line extending from a source of hot water to a hot and cold water mixing valve;
    a second hot water line connected to an outlet of said hot and cold water mixing valve and having at least one opening and closing valve connected to said second hot water line;
    a third hot water line extending from each said at least one opening and closing valve to a respective shower discharging port;
    a first drain valve disposed before said hot and cold water mixing valve in said first hot water line;
    a first drain line extending from a drain port at a lower portion of the shower apparatus to said first drain valve;
    an operation control section for controlling the operation of said at least one opening and closing valve and said drain valve; and
    temperature sensing means for detecting a water temperature in said first hot water line;
    said operation control section comprising first water disposal control means for opening said first drain valve when the temperature of the water in said first hot water line is lower than a predetermined level, thereby adding water to said first hot water line from said source of hot water until the temperature of water in said first hot water line rises to said predetermined level.

2. A shower apparatus according to claim 1, wherein said first water disposal control means comprises means for controlling said first drain valve to open when the water temperature of said first hot water line does not reach said predetermined level within a predetermined time after opening said first drain valve.

3. A shower apparatus according to claim 1, wherein said second hot water line and said drain line are connected to each other by a second drain valve.

4. A shower apparatus according to claim 3, wherein said operation control section further comprises:
    second water disposal control means for controlling said second drain valve to open to dispose water until the temperature of the water in said second hot water line reaches a predetermined temperature after the water temperature of said first hot water line reaches at least said predetermined level under the control of said first disposal water control means.

5. A shower apparatus according to claim 4, further comprising:
    second hot water temperature sensing means disposed in said second hot water line, wherein said second water disposal control means comprises means for controlling said second drain valve to open for a period of time including the time that the water temperature is detected by said second hot water temperature sensing means to be below a predetermined temperature, to a predetermined time after the closing of said corresponding opening and closing valve.

6. A shower apparatus according to claim 3, wherein each said third hot water line and said drain line are connected to each other by a third drain valve.

7. A shower apparatus according to claim 6, wherein said operation control section further comprises:
    third water disposal control means for controlling each said third drain valve to open after each said opening and closing valve of each corresponding third hot water line is opened.

8. A shower apparatus according to claim 7, further comprising means for controlling said third drain valve based upon a water disposal control cycle, said water disposal control cycle comprising an operation period during which said third water disposal control means is allowed to open said third drain valve, and a stop period during which the opening of said third drain valve is stopped.

9. A shower apparatus according to claim 8, wherein said third water disposal control means controls each said third drain valve to open substantially at the same time that each corresponding opening and closing valve is opened during the operation period of said water disposal control cycle, and each said third drain valve which corresponds to each opening and closing valve is further opened during an operation period of the next cycle of said water disposal control cycle when a corresponding opening and closing valve is closed during the stop period of said water disposal control period.

10. A shower apparatus according to claim 9, wherein said third water disposal water control means controls each said third drain valve to open for a predetermined time during separate respective operation periods, comprising a first operation period and a second operation period, when the time at which each said third drain valve is opened concurrently with the opening of each corresponding opening and closing valve is approaching the operation period of the next cycle of said water disposal control cycle; and further wherein a time between the opening of each said third drain valve during the operation period and the end of the operation period is shorter than the predetermined opening time of each said third drain valve.

11. A shower apparatus according to claim 1, wherein each said third hot water line and said drain line are connected to each other by a third drain valve.

12. A shower apparatus according to claim 11, wherein said operation control section further comprises:
    third water disposal control means for controlling each said third drain valve to open after each said opening and closing valve of each corresponding third hot water line is opened.

13. A shower apparatus according to claim 12, further comprising means for controlling said third drain valve based upon a water disposal control cycle, said water disposal control cycle comprising an operation period during which said third water disposal control means is allowed to open said third drain valve, and a stop period during which the opening of said third drain valve is stopped.

14. A shower apparatus according to claim 13, wherein said third water disposal control means controls each said third drain valve to open substantially at the same time that each corresponding opening and closing valve is opened during the operation period of said water disposal control cycle, and each said third drain valve which corresponds to each opening and closing valve is further opened during an operation period of the next cycle of said water disposal control cycle when a corresponding opening and closing valve is closed during the stop period of said water disposal control period.

15. A shower apparatus according to claim 14, wherein said third water disposal water control means controls each said third drain valve to be opened for a predetermined time during separate respective operation periods, comprising a first operation period and a second operation period, when the time at which each said third drain valve is opened concurrently with the opening of each corresponding opening and closing valve is approaching the operation period of the next cycle of said water disposal control cycle; and further wherein a time between the opening of each said third drain valve during the operation period and the end of the operation period is shorter than the predetermined opening time of each said third drain valve.

16. A shower apparatus according to claim 1, wherein said first disposal water control means controls said first drain valve to remain open for a predetermined time interval after a corresponding opening and closing valve has closed.

17. A shower apparatus according to claim 1, said apparatus further comprising:
   a second drain line connected between said hot and cold water mixing valve and said at least one opening and closing valve;
   a second drain valve disposed in said second drain line to open and close said second drain line; and
   a control section for controlling the opening and closing of said at least one opening and closing valve and of said second drain valve, wherein when water is not being discharged from a respective shower discharge port after the shower has been stopped for a predetermined amount of time, said control section causes said second drain valve to be opened for a predetermined time.

18. A shower apparatus according to claim 17, wherein said control section comprises means for opening and closing said second drain valve as a function of (1) the amount of time that has lapsed since the shower has been stopped, and (2) the temperature of residual water in the hot water line, at a location between the hot and cold water mixing valve and said at least one opening and closing valve.

* * * * *

UNITED STATES PATENT AND TRADEMARK OFFICE
CERTIFICATE OF CORRECTION

PATENT NO. : 5,414,879
DATED : May 16, 1995
INVENTOR(S) : K. HIRAISHI et al.

It is certified that error appears in the above-indentified patent and that said Letters Patent is hereby corrected as shown below:

On the cover, section [56], "References Cited", "U.S. PATENT DOCUMENTS", insert:

---4,964,181 10/1990 Alpert         4/597
   4,901,915  2/1990 Sakakibara     236/12.12
   4,765,030  7/1990 Juliver        4/661x
   4,909,435  3/1990 Kidouchi et al. 236/12.12
   4,941,608  7/1990 Shimizu et al.  236/12.12---.

On the cover, section [56], "References Cited", "FOREIGN PATENT DOCUMENTS", insert:

---0194625 3/1986 European Pat. Off.
   8811545 2/1989 Germany
   8704059 7/1987 W.I.P.O.
   3443780 6/1986 Germany
   0195271 9/1986 European Pat. Off.---.

Signed and Sealed this

Fifteenth Day of April, 1997

Attest:

BRUCE LEHMAN

Attesting Officer    Commissioner of Patents and Trademarks